(12) United States Patent
Thostenson et al.

(10) Patent No.: US 7,786,736 B2
(45) Date of Patent: Aug. 31, 2010

(54) METHOD AND SYSTEM FOR DETECTING DAMAGE IN ALIGNED CARBON NANOTUBE FIBER COMPOSITES USING NETWORKS

(75) Inventors: Erik T. Thostenson, Newark, DE (US); Tsu-Wei Chou, Newark, DE (US)

(73) Assignee: University of Delaware, Newark, DE (US)

( * ) Notice: Subject to any disclaimer, the term of this patent is extended or adjusted under 35 U.S.C. 154(b) by 315 days.

(21) Appl. No.: 11/906,366

(22) Filed: Oct. 2, 2007

(65) Prior Publication Data

US 2008/0173111 A1 Jul. 24, 2008

Related U.S. Application Data

(63) Continuation-in-part of application No. 10/567,349, filed as application No. PCT/US2004/025272 on Aug. 6, 2004.

(60) Provisional application No. 60/492,904, filed on Aug. 6, 2003.

(51) Int. Cl.
    *G01R 31/08* (2006.01)
(52) U.S. Cl. ................... 324/525; 324/713; 324/718
(58) Field of Classification Search ......... 324/713–719, 324/525
    See application file for complete search history.

(56) References Cited

U.S. PATENT DOCUMENTS

| 5,993,922 | A | 11/1999 | Babrowicz et al. |
| 6,265,466 | B1 | 7/2001 | Glatkowski et al. |
| 6,299,812 | B1 | 10/2001 | Newman et al. |
| 6,331,265 | B1 | 12/2001 | Dupire et al. |
| 6,790,425 | B1 | 9/2004 | Smalley et al. |
| 7,060,241 | B2 | 6/2006 | Glatkowski |
| 7,088,120 | B2 * | 8/2006 | Matsumoto et al. ......... 324/762 |
| 2002/0058780 | A1 | 5/2002 | Moses et al. |
| 2002/0113335 | A1 | 8/2002 | Lobovsky et al. |

OTHER PUBLICATIONS

Neil Thomas, UD Scientists Use Carbon Nanotubes to Detect Defects in Composits, UDaily, Oct. 4, 2006.
Erik T. Thostenson and Tsu-Wei Chou, Carbon Nanotube Networks: Sensing of Distributed Strain and Damage for Life Prediction and Self Healing, Advanced Materials, vol. 18, 2006, pp. 2837-2841.
Satish Kumar et at., Fibers from Polypropylene/Nano Carbon Fiber Composites, Polymer Communication, vol. 43, 2002, pp. 1701-1703 Mar. 19, 2001.

(Continued)

*Primary Examiner*—Vincent Q Nguyen
(74) *Attorney, Agent, or Firm*—RatnerPrestia

(57) ABSTRACT

Methods and structural defect detectors for detecting a structural defect in composites are presented. An exemplary method includes forming a nanocomposite including a plurality of nanotubes mechanically aligned in a principal direction within a polymer matrix. A voltage is applied to the nanocomposite and a resistance of the nanocomposite is measured using the applied voltage to detect the structural defect. An exemplary structural defect detector includes a nanocomposite including a plurality of mechanically aligned nanotubes within the polymer matrix, electrodes coupled to the nanocomposite, a voltage source for applying a voltage to the electrodes, and a resistance detector for measuring a resistance of the nanocomposite that allows identification of a structural defect. The plurality of nanotubes form a conducting percolating network of sensors.

20 Claims, 36 Drawing Sheets

OTHER PUBLICATIONS

R. Andrews et al., Nanotube Composite Carbon Fibers, Applied Physica Letters, vol. 75, No. 9, Aug. 30, 1999, pp. 1329-1331.

Ian A. Kinloch et at., A Rhetological Study Concentrated Aqueous Nanotube Dispersions, Polymers Communication, vol. 43, 2002, pp. 7483-7491, 2002.

Haggenmueller et al., "Aligned single-wall carbon nanotubes in composites by melt processing methods," Chemical Physical Letters 330, Nov. 10, 2000, pp. 219-225.

Thostenson et al, "Rapid Communication: Aligned multi-walled carbon nanotube-reinforced composites: processing and mechanical characterization," J. Phys. D: Appl. Phys. 35 (2002) L77-L-80.

Sinnott et al., "Mechanical properties of nanotubule fibers and composites determined from theoretical calculations and simulations," Carbon vol. 36, Nos. 1-2, pp. 1-9, 1998.

International Search Report for PCT International Application PCT/US04/25272 mailed Jan. 3, 2005.

* cited by examiner

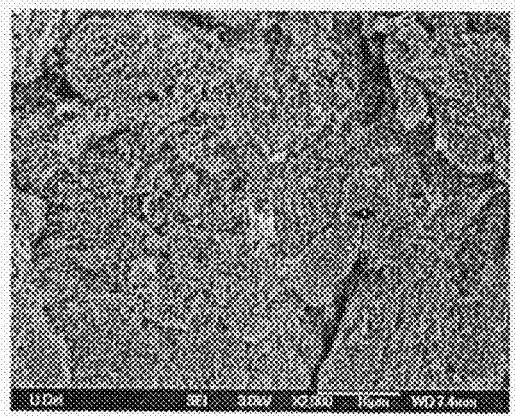 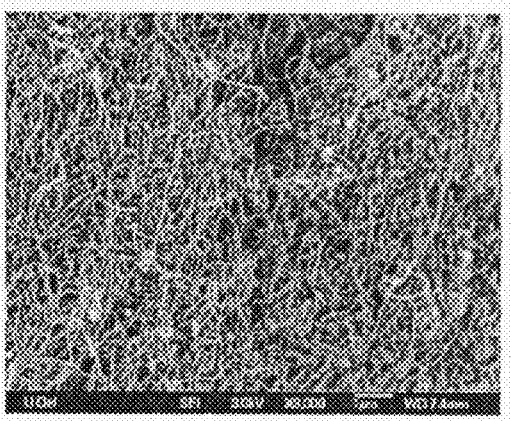
*FIG. 22A*  *FIG. 22B*

(a)

(b)

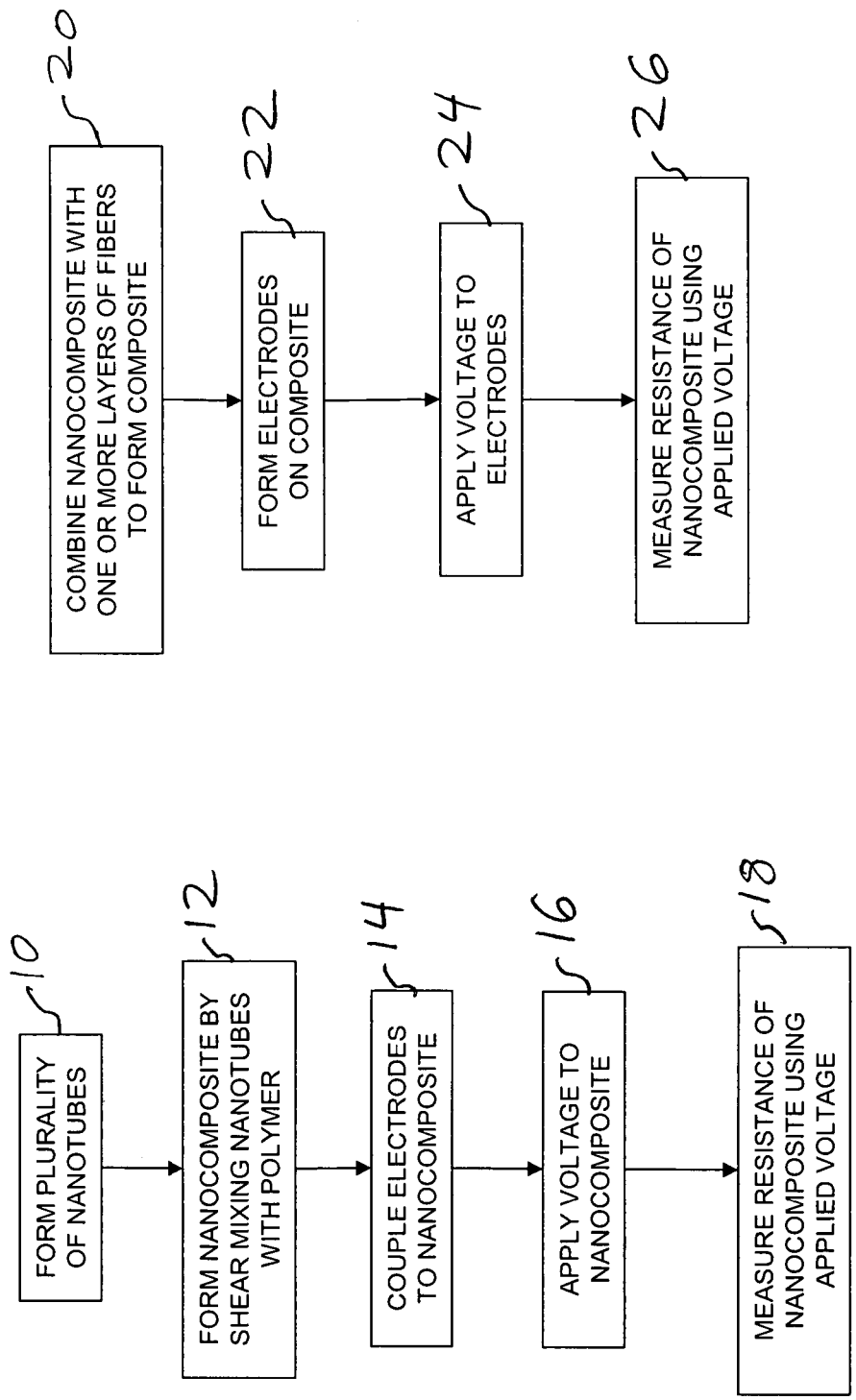

US 7,786,736 B2

METHOD AND SYSTEM FOR DETECTING DAMAGE IN ALIGNED CARBON NANOTUBE FIBER COMPOSITES USING NETWORKS

CROSS REFERENCE TO RELATED APPLICATIONS

This application is a continuation in part of U.S. Nonprovisional application Ser. No. 10/567,349 file Mar. 28, 2007 which is a National Stage Entry of International Application No. PCT/US04/25272 filed Aug. 6, 2004 and which is related to and claims the benefit of U.S. Provisional Application 60/492,904, filed Aug. 6, 2003, the entire contents of which are hereby incorporated by reference.

STATEMENT REGARDING FEDERALLY SPONSORED RESEARCH

The U.S. Air Force Office of Scientific Research funded this research under contract number F49620-02-1-0328.

FIELD OF THE INVENTION

The present invention relates to the technical field of carbon nanotube-reinforced polymer composites and, in particular, to the detection of structural defects in the polymer matrix of the composite.

BACKGROUND

The exceptional mechanical and physical properties observed for carbon nanotubes has stimulated the development of nanotube-based composite materials. Such properties observed at the nanoscale have motivated researchers to utilize carbon nanotubes as reinforcement in composite materials. At the nanoscale, the structure of the carbon nanotube strongly influences the overall properties of the resulting nanotube-based composite material. Carbon nanotubes are believed to have elastic moduli on the order of 1 TPa (1000 GPa) with strengths in the range of 30 GPa, in addition to exceptionally high electrical and thermal conductivity. These properties, combined with recent advances, have generated considerable interest in utilizing carbon nanotubes as nanoscale reinforcement in composites. Research has shown that the change in length scale of carbon nanotubes relative to carbon fibers enables selective reinforcement of the polymer matrix surrounding a carbon fiber. Local stiffening due to nanotubes results in improved load transfer at the fiber/matrix interface.

Although exceptional electrical, thermal, and mechanical properties of carbon nanotubes have been researched, expected property enhancements in composites have not been realized. One of the most significant challenges in improving the properties of nanocomposites based on carbon nanotubes is to obtain a uniform dispersion of nanotubes within the polymer matrix, which is needed to achieve good reinforcement in a composite. Because of their small size, carbon nanotubes tend to agglomerate when dispersed in a polymeric resin. In addition to slipping of nanotubes that are not adhered to the matrix, aggregates of nanotube bundles effectively reduce the aspect ratio (length/diameter) of the reinforcement.

SUMMARY OF THE INVENTION

The present invention is embodied in methods and structural defect detectors for detecting a structural defect in a composite. One aspect of the invention comprises a method that includes forming a nanocomposite comprising a plurality of nanotubes mechanically aligned in a principal direction, applying a voltage to the nanocomposite, and measuring a resistance of the nanocomposite using the applied voltage to detect the structural defect.

Another aspect of the invention comprises a structural defect detector comprising a nanocomposite comprising a plurality of nanotubes within a polymer matrix in which the plurality of nanotubes are mechanically aligned in a principal direction, a plurality of electrodes coupled to the nanocomposite, a voltage source for applying a voltage to the electrodes, and a resistance detector for measuring a resistance of the nanocomposite that allows identification of a structural defect, wherein the plurality of nanotubes form a conducting percolating network of sensors.

BRIEF DESCRIPTION ON THE FIGURES

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawings are the following figures:

FIGS. 22A and 22B are scanning electron micrographs of bulk carbon nanotubes that are entangled and form large agglomerates;

FIGS. 34A and 34B are flowcharts illustrating exemplary methods for detecting changes in resistance in a nanocomposite, according to an embodiment of the invention;

DETAILED DESCRIPTION

Figure 1:
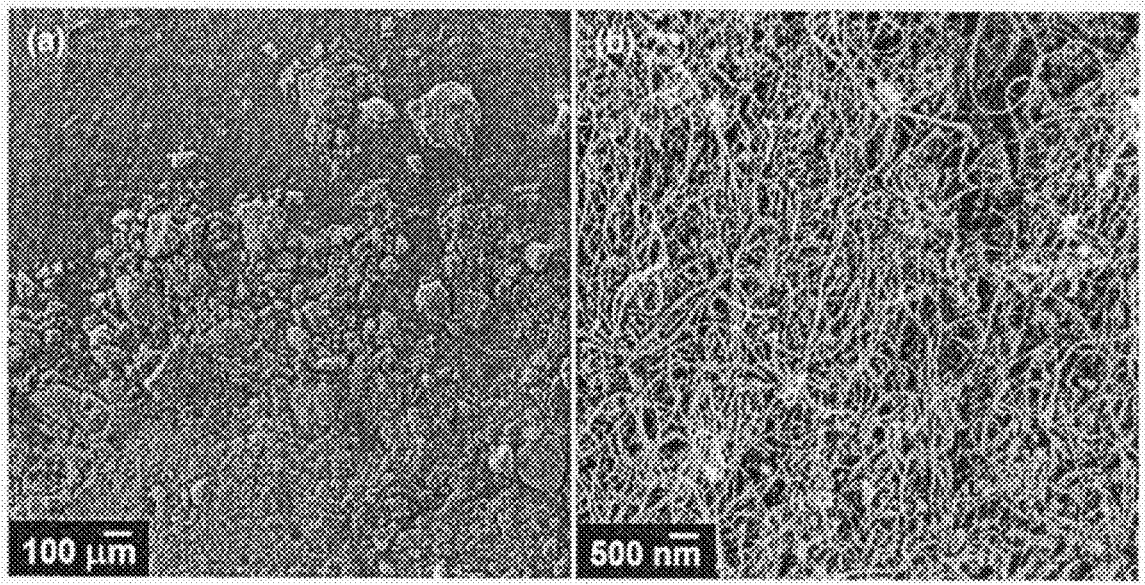
FIG. 1 illustrates scanning electron microscope (SEM) micrographs of as-grown carbon nanotubes.
Figure 2:
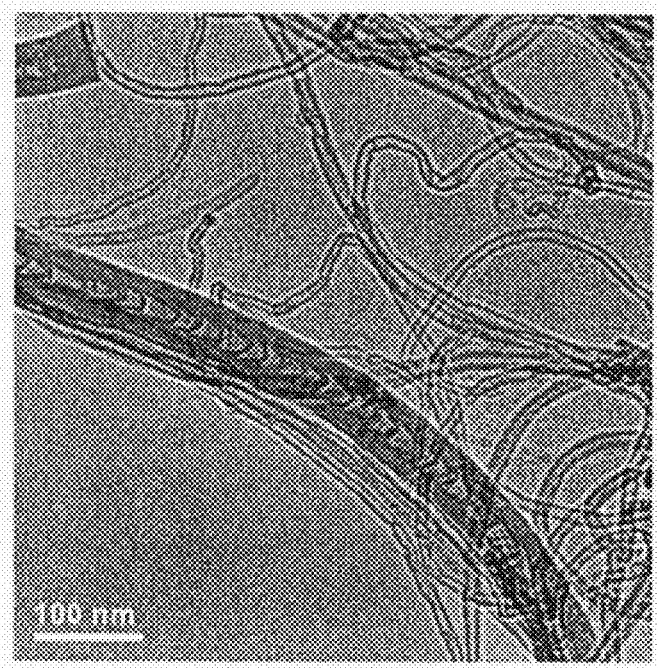
FIG. 2 is a transmission (TEM) micrograph of variations in nanotube morphology.

In composite materials there exists a strong interrelationship between the local structure at the micro or nano scales and the bulk properties. The local internal structure of a composite is formed during the processing step. FIG. 1 illustrates SEM micrographs of as-grown carbon nanotubes, prior to processing. After growth, the nanotubes are agglomerated as large clumps of black powder. FIG. 1(a) is a low magnification image of the bulk nanotube powder showing large agglomerates. These agglomerates result from substantial nano-scale spaghetti-like entanglement of the carbon nanotubes, as shown in FIG. 1(b). The mechanical interlacing of carbon nanotubes is a significant barrier toward achieving a homogeneous dispersion of nanotubes in a composite. In addition to nanotube entanglement, FIG. 2 illustrates large variations in nanotube outside diameters.

To utilize nanotubes in a practical material or device, nanotubes should be separated and oriented in a way to take advantage of their nanoscale properties. For example, the properties of nanotube composites are strongly influenced by nanotube diameter and orientation. For multi-walled nanotubes, there is typically a distribution of diameters, and modeling the diameter distribution of the reinforcement allows for accurate modeling of overall nanotube composite elastic properties.

Methods of processing nanotube composites according to the present embodiments produce nanotube composites where individual nanotubes are both dispersed homogeneously throughout the matrix phase, having nanoscale dispersion, and nanoscale alignment in a primary direction. In one embodiment, a nanotube composite includes carbon nanotubes and has the form of a macroscopic ribbon of aligned composite.

According to the present embodiments, such dispersion and alignment can be achieved through the use of high-shear-stress mixing of a molten polymer using a twin-screw extruder followed by extrusion and extensional flow prior to solidification. Shear stresses break up the large agglomerates and disperse nanotubes throughout the matrix, and extensional flow prior to solidification serves to further untangle the nanotubes and align them in the direction of extension.

The methods for fabrication of carbon nanotube composite ribbons according to the present embodiments are readily scalable and can be applied to the fabrication of larger-scale structural/functional materials and devices. Based upon orientation of the nanotubes, the materials can be tailored for specific properties and may have uses in structural, electrical (e.g. EMI shielding, electronics) and thermal (e.g. heat dissipation) applications for multi-functional materials and devices based upon carbon nanotubes.

In accordance with another embodiment, exemplary polymer nanocomposites are used as to detect defects in the polymer matrix. When a voltage is applied to carbon nanotube composites having nanotubes aligned in a principal direction, the carbon nanotubes act as a conducting percolating network of sensors. A change in resistance may be determined based on the applied voltage and used to detect structural defects of the polymer matrix. The exemplary polymer nanocomposite may be fabricated with another material. For example, the material may include with one or more layers of unidirectionally and/or cross ply oriented fibers, such as glass or aramid fibers, to form a fiber-polymer composite.

The present embodiments address the need to describe the fundamental reinforcement mechanisms in nanotube-based composites and develop methods to relate the nanotube nanoscale structure to the properties of nanotube-based composites. In one embodiment, taking into account the nanoscale features of a carbon nanotube, a micromechanical model is applied to determine the composite elastic properties of nanotubes based on the properties of the constituent materials and the structure of carbon nanotubes.

The micromechanics may then be applied to a processing technique for a model system of multi-walled carbon nanotubes embedded in a thermoplastic or thermoset polymer mix such as, but not limited to, polystyrene polymer matrix. Continuous macroscopic ribbons of aligned nanocomposites may be formed using the processing technique. The nanoscale structure of the composites may be characterized using electron microscopy and x-ray diffraction.

Solvent dispersion may be utilized to obtain micron-scale dispersion of the nanotubes in the polymer matrix, followed by melt compounding with the micro-scale twin-screw extruder to achieve nanoscale dispersion. The micro-scale compounding provides the high shear mixing necessary to untangle the CVD-grown multi-walled nanotubes and to disperse the nanotubes uniformly in the thermoplastic polymer matrix.

Highly aligned nanocomposite films can be produced by extruding the polymer through a rectangular die and controlled drawing of the film prior to solidification. Electron microscopy and x-ray diffraction results indicate that both the shear and extensional flows result in significant process-induced alignment of the nanocomposite structure. The method of extruding and drawing the molten polymer creates a continuous ribbon of aligned nanocomposite that may then be laminated using traditional composites processing methods, such as autoclave molding or tape placement, to create macroscale aligned nanocomposites.

The following discussion is addressed to modeling techniques used to predict elastic properties in nanotube reinforced composites.

According to the present embodiments, the structure of the nanotube is taken into account and the properties of an "effective fiber" are defined. The definition of effective fiber properties is then used to determine the elastic properties of a resulting composite including the nanotubes based on a micromechanics approach. Micromechanical models for discontinuous fiber composites include the shear-lag analysis, plane stress elasticity solutions, and the bound approach. According to the present embodiments, the approach of Halpin and Tsai (J. C. Halpin and S. W. Tsai, *Environmental Factors in Composite Materials Design*, U.S. Air Force Technical Report AFML TR 67-423 (1967) and J. C. Halpin, *Primer on Composite Materials: Analysis*, Technomic Publishing Company, Lancaster, Pa. (1984)), are utilized to determine the properties of a unidirectional discontinuous fiber composite. Other methods, however, may be used.

Figure 3:
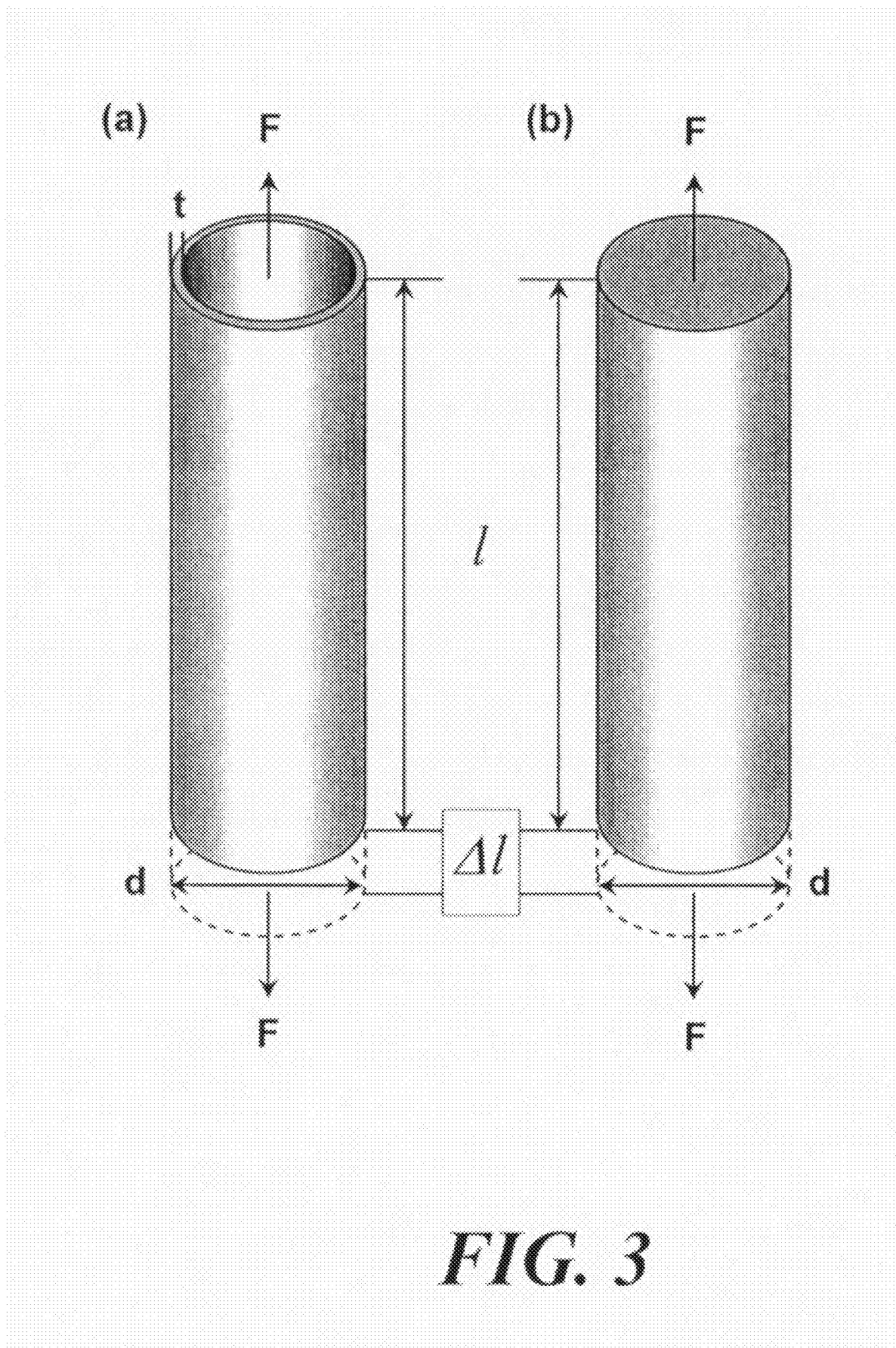
FIG. 3 is a schematic view of a nanotube and an effective fiber used to model the elastic properties of nanotubes embedded in a composite.

According to the present embodiments, when modeling the properties of a nanotube-based composite, the nano-scale structure of multi-walled carbon nanotubes is considered as well as the load transferring from the matrix to the nanotube via shear stresses at the nanotube/matrix interface. To determine the effective elastic modulus of a nanotube embedded in a composite, the load carrying capability of the outer layer of the nanotube is applied to the entire cross-section of the nanotube. The elastic modulus of the nanotube may be modeled by considering that the outer wall of the nanotube acts as an effective solid fiber with the same deformation behavior and same diameter (d) and length (l) shown in FIG. 3. An applied external force on the nanotube and the fiber will result in an iso-strain condition:

$$\epsilon_{NT} = \epsilon_{\textit{eff}} \quad (1)$$

where the subscripts NT and eff refer to the nanotube and effective fiber, respectively. From Equation (1) the elastic properties of the nanotubes are related to that of an effective fiber:

$$E_{\textit{eff}} = \frac{\sigma_{\textit{eff}}}{\sigma_{NT}} E_{NT} \quad (2)$$

Because the applied external force is the same, the effective moduli can be expressed in terms of the ratio of their cross-sectional areas.

$$E_{\textit{eff}} = \frac{A_{NT}}{A_{\textit{eff}}} E_{NT} \quad (3)$$

After substituting, the modulus of the effective fiber can be expressed in terms of the elastic modulus of the nanotube, the nanotube outer layer thickness (t=0.34 nm), and the nanotube diameter (d).

$$E_{\textit{eff}} = \frac{4t}{d} E_{NT} \quad (4)$$

It is understood that the above expression is valid for (t/d)<0.25.

Various models are suitable to predict the elastic properties of fiber composites in terms of the properties of the constituent materials. Many solutions can be reduced to the following general form and is widely referred to as the Halpin-Tsai equations:

$$E_c = E_m \left( \frac{1 + \zeta \eta V_f}{1 - \eta V_f} \right) \quad (5)$$

$$\eta = \frac{\frac{E_f}{E_m} - 1}{\frac{E_f}{E_m} - \zeta} \quad (6)$$

where $E_c$ is the composite elastic modulus, $V_f$ is the fiber volume fraction, $E_f$ and $E_m$ are the fiber and matrix modulus, respectively. In Equations (5) and (6), the parameter $\zeta$ is dependent on the geometry and boundary conditions of the reinforcement phase. For an aligned short fiber composite, this parameter can be expressed as:

$$\zeta = 2\frac{l}{d} + 40 V_f \quad (7)$$

and for low volume fractions:

$$\zeta = 2\frac{l}{d} \quad (8)$$

The nanocomposite elastic modulus can be expressed in terms of the properties of the polymer matrix and the nanotube reinforcement:

$$E_{11} = E_m \left(1 + 2\left(\frac{l}{d}\right)\left(\frac{\frac{E_{NT}}{E_m} - \frac{d}{4t}}{\frac{E_{NT}}{E_m} - \frac{d}{2t}}\right)V_{NT}\right)\left(1 - \left(\frac{\frac{E_{NT}}{E_m} - \frac{d}{4t}}{\frac{E_{NT}}{E_m} - \frac{d}{2t}}\right)V_{NT}\right)^{-1} \quad (9)$$

where, following standard notation used for traditional fibrous composites, $E_{11}$ is the elastic modulus in the principal material direction, which is the direction of nanotube orientation. Equation (9) is valid for $l>d>d>4t$. The nanotube diameter must be known since the reinforcement efficiency of the nanotube changes with diameter.

For multi-walled carbon nanotubes, there will typically be a distribution of nanotube diameters in a given sample. Experimental data for nanocomposites are typically expressed in terms of the weight fraction of reinforcement. The nanotube weight fraction ($W_{NT}$) does not explicitly describe the content of reinforcement because it depends on the relative densities of the matrix and the nanotube. Furthermore, the nanotube diameter and wall structure will significantly influence the nanotube density. As a consequence, it is important to have knowledge of the size and structure of the carbon nanotubes used in processing of the composite system.

The distribution of nanotube diameters for a specific nanotube sample can be determined by measuring the outside diameter of a statistically large sample of nanotubes and then using the experimental data to determine the probability distribution of nanotubes $\xi(d)$. For the purpose of modeling the composite elastic properties, the volume fraction of carbon nanotubes within the composite are relevant. From the diameter distribution the volume distribution of nanotubes per unit length $\psi(d)$ can be defined:

$$\psi(d) = \frac{d^2 \xi(d)}{\int_0^\infty (d^2 \xi(d))\, d(d)} \quad (10)$$

The above volume distribution is considered when calculating the overall nanocomposite properties.

The density of the nanotubes and the polymer matrix are used for the conversion of weight fraction to volume fraction for predicting elastic properties (Equation (9)). For fibrous composites, the volume fraction of fibers can be calculated based on the density of the constituents:

$$V_f = \frac{\rho_c}{\rho_f} W_f \quad (11)$$

where $$\rho_c = \rho_f V_f + \rho_m V_m \quad (12)$$

where the $\rho$ is density and the subscripts f, m and c refer to the fiber, matrix and composite, respectively. Substituting (12) into (11) the volume fraction can be calculated from:

$$V_f = \frac{W_f}{W_f + \frac{\rho_f}{\rho_m} - \frac{\rho_f}{\rho_m} W_f} \quad (13)$$

Figure 4:
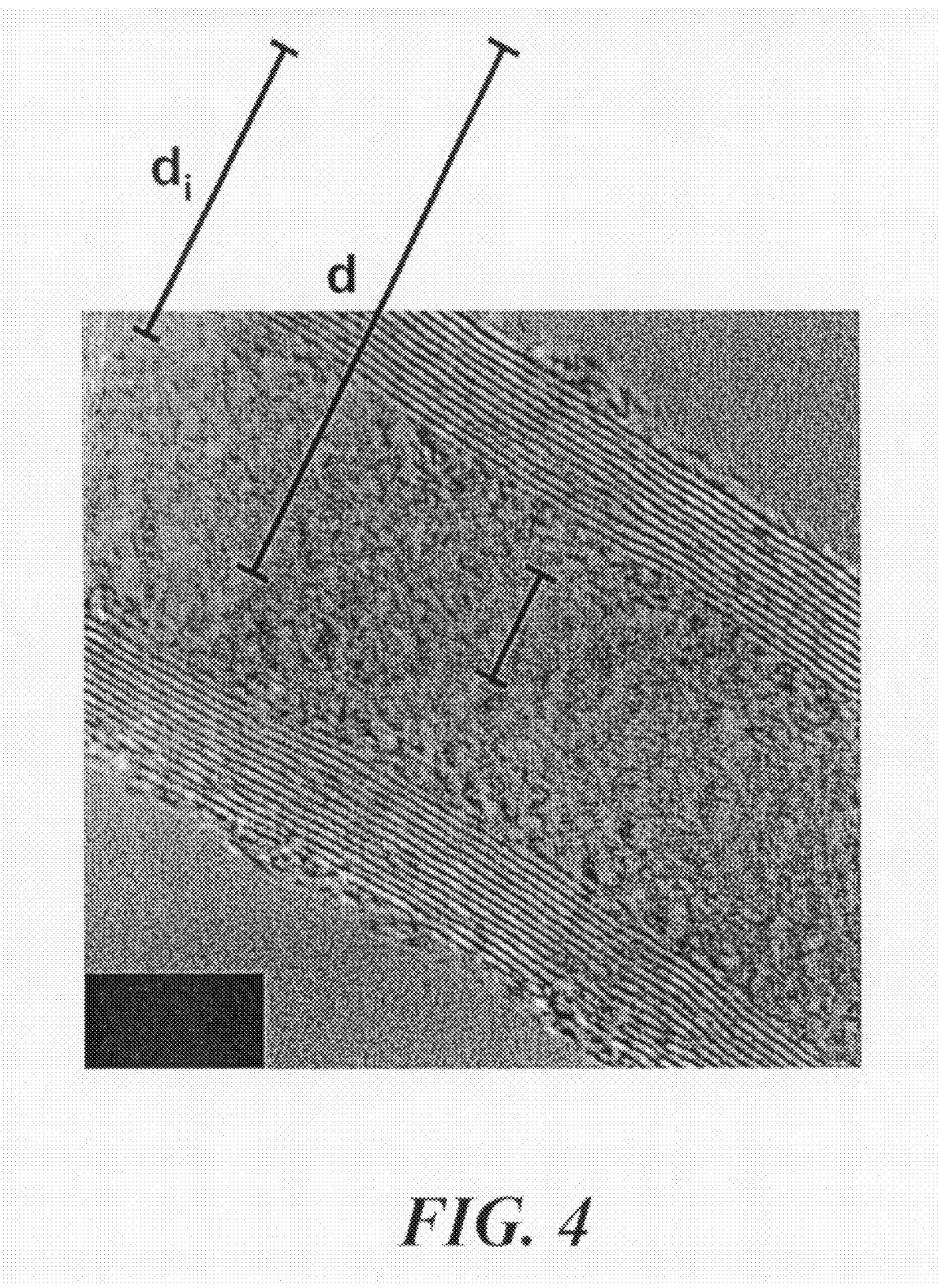
FIG. 4 is TEM micrograph of a multi-walled carbon nanotube.

FIG. 4 is a TEM micrograph of a multi-walled carbon nanotube. The outside diameter (d) and inside diameter ($d_i$) of the nanotube can be measured directly from the micrograph using image analysis. From the measurements of inside and outside diameter, the nanotube density can be calculated:

$$\rho_{NT} = \frac{\rho_g (d^2 - d_i^2)}{d^2} \quad (14)$$

The density of a multi-walled nanotube will increase with the number of walls (thickness of the outer shell).

Equation (9) expresses the diameter-dependence of the carbon nanotube reinforcement on the nanocomposite properties. To accurately model the elastic properties of the composite, the contribution to the overall elastic modulus for each nanotube diameter and the volume fraction that tubes of a specific diameter occupy within the composite are accounted for. If the nanotubes are uniformly dispersed and aligned throughout the matrix phase, the contribution of each diameter can be considered to act in parallel. Therefore, the elastic modulus of the composite can be calculated as a summation of parallel composites over the range of nanotube diameters.

Figure 5:
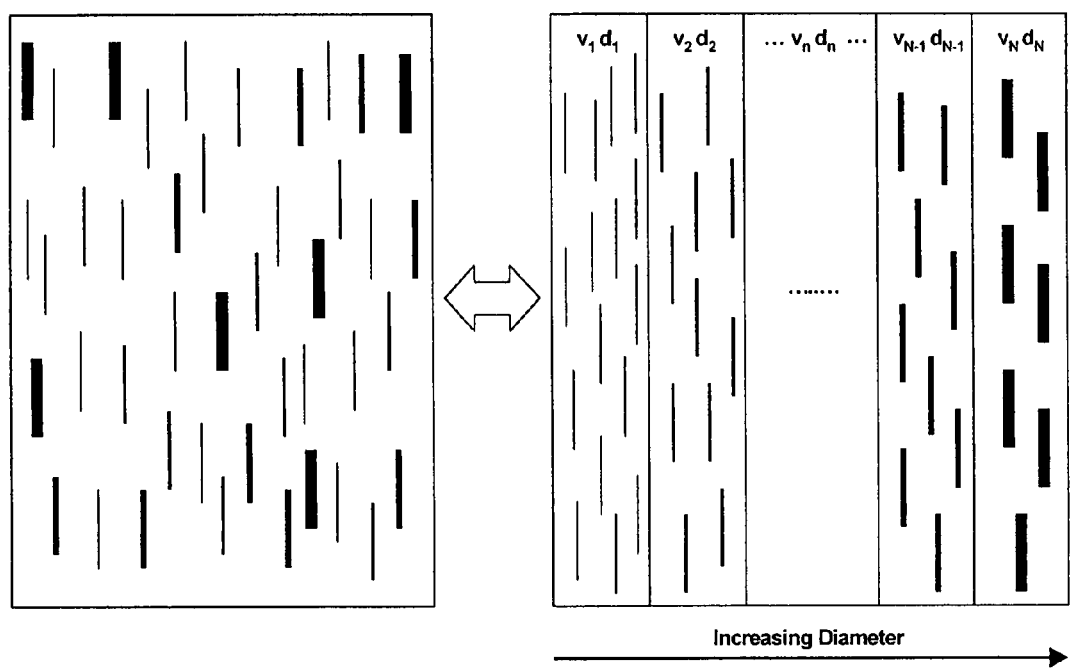
FIG. 5 illustrates the equivalence between a dispersed composite and N composites each with a specific nanotube diameter and partial volume acting in parallel.

FIG. 5 illustrates the equivalence between a dispersed composite and N composites, each with a specific nanotube diameter and partial volume acting in parallel. With the assumption of iso-strain, the modulus of the composite can be expressed as a summation of the moduli scaled by the partial volume of each $n^{th}$ composite:

$$E_c = \sum_{n=1}^{N} v_n E_n \bigg|_{d_n} \quad (15)$$

where $E_n|_{d_n}$ is the elastic modulus of the composite calculated from Equation (9) at the nanotube diameter included in the $n^{th}$ segment and $v_n$, is the partial volume of the $n^{th}$ composite:

$$v_n = \frac{V_n}{V} \quad (16)$$

$$\sum_{n=1}^{\infty} v_n = 1 \quad (17)$$

where $V_n$ is the volume of the $n^{th}$ composite and V is the overall composite volume.

To calculate the modulus at a given diameter, $E_n$ in Equation (15), the local volume fraction at a given nanotube diameter, $V_{NT}|_d$, can be calculated from the volume distribution of nanotubes (Equation 10).

$$V_{NT}|_{d_n} = \frac{\int_{d_n}^{d_n + \Delta d_n} (V_{NT} \psi(d))\, d(d)}{v_n} \quad (18)$$

where $V_{NT}$ is the total volume fraction of tubes in the composite calculated from Equation (13) and the limits of the integral are the range of diameters included in the $n^{th}$ composite.

Figure 6:
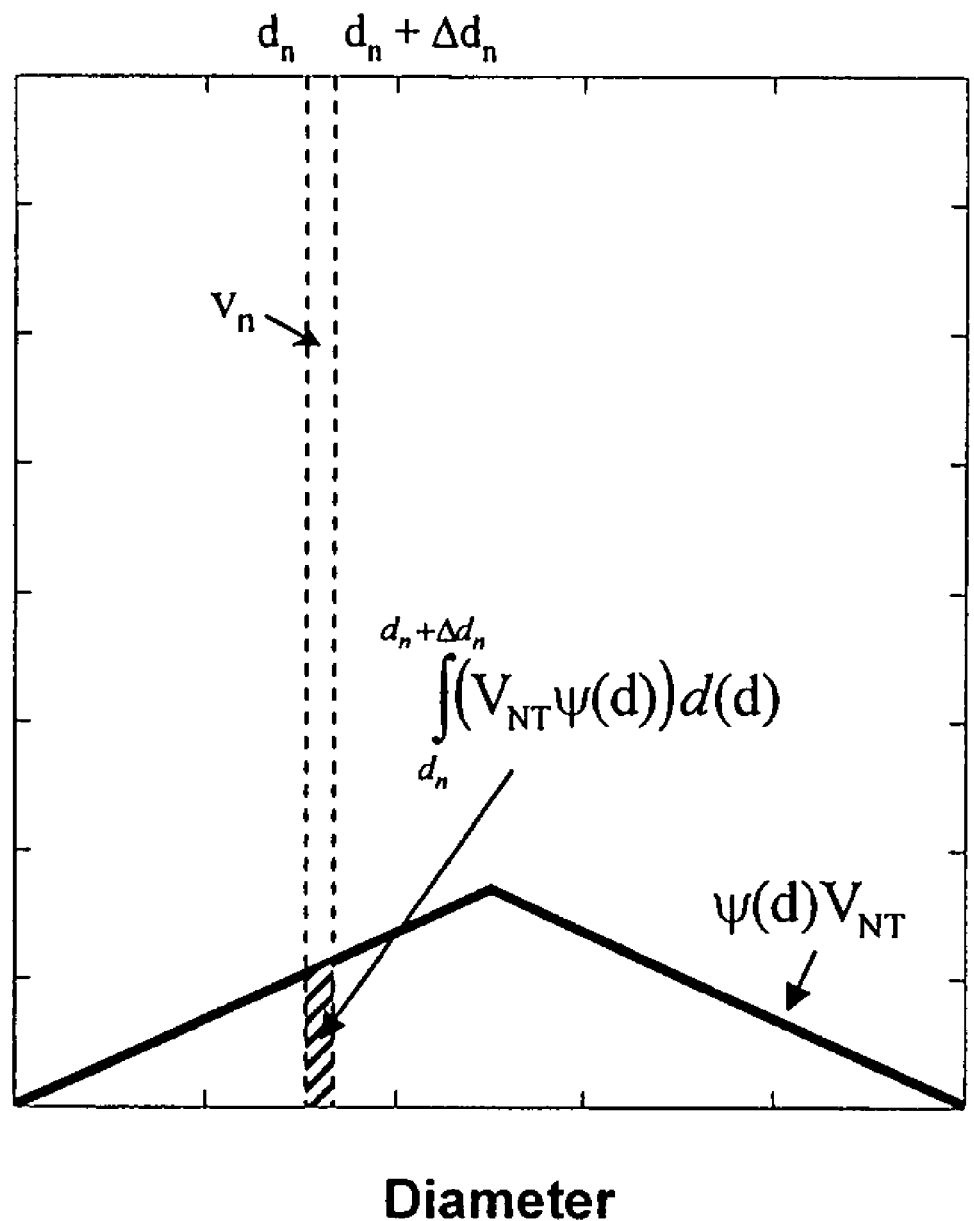
FIG. 6 is a graphical representation of the calculation of local nanotube volume fraction when given an arbitrary distribution in nanotube diameters.

FIG. 6 is a graphical representation of the calculation of local nanotube volume fraction when given an arbitrary distribution in nanotube diameters, and illustrates schematically the computation for the nanocomposite elastic modulus described in Equations (15-18). The solid curve in FIG. 6 is the product of some arbitrary nanotube volume distribution, ψ(d), and nanotube volume fraction, $V_{NT}$, within the composite. The shaded area beneath the curve represents the nanotube volume fraction. The $n^{th}$ composite is a narrow "slice" of the graph, represented by the dashed vertical lines, where there exists a narrow distribution of nanotube diameters dn. The partial volume of the $n^{th}$ composite, $v_n$ in Equation (16), is then the area between those dashed lines. Calculation of the local volume fraction of nanotubes in the $n^{th}$ composite is simply the area between the dashed lines underneath the solid curve, shown by the hatched area, divided by the total area between the dashed lines.

To predict the elastic modulus of a nanotube composite system, information on the structure of the nanotubes as well as the structure of the nanocomposite is required. According to the present embodiments, a model composite is produced of aligned multi-walled carbon nanotubes embedded in a polystyrene matrix. The structure of both the nanotube reinforcement and the nanocomposite may be quantified using electron microscopy, and the elastic properties characterized using a dynamic mechanical analyzer (DMA). The mechanical characterization results are then compared with structure/property modeling approach discussed above.

The processing and structural characterization of nanotubes-based composites, according to the present embodiments, will now be discussed.

One of the most significant difficulties in processing of nanotube composites is to obtain a uniform dispersion of nanotubes within the polymer matrix. In particular, CVD-grown carbon nanotubes become entangled during the nanotube growth process. In addition to uniform dispersion of nanotubes within the matrix, it is important to process model systems with controlled structure and alignment so that the anisotropic properties of nanotube-based composites can be understood.

A micro-scale twin-screw extruder may be utilized to obtain high shear mixing necessary to untangle the CVD-grown multi-walled nanotubes and disperse them uniformly in a polystyrene thermoplastic matrix. To create an aligned system, the polymer melt is extruded through a rectangular die and drawn under tension prior to solidification. The process of extruding the nanocomposite through the die and subsequent drawing results in a continuous ribbon of aligned nanocomposite.

To quantify the structure for the nanotubes, high-resolution TEM micrographs were taken of CVD-grown tubes and image analysis software was utilized to measure the structural dimensions to quantify both the distribution of nanotube diameters and the nanotube wall structure.

Figure 7:
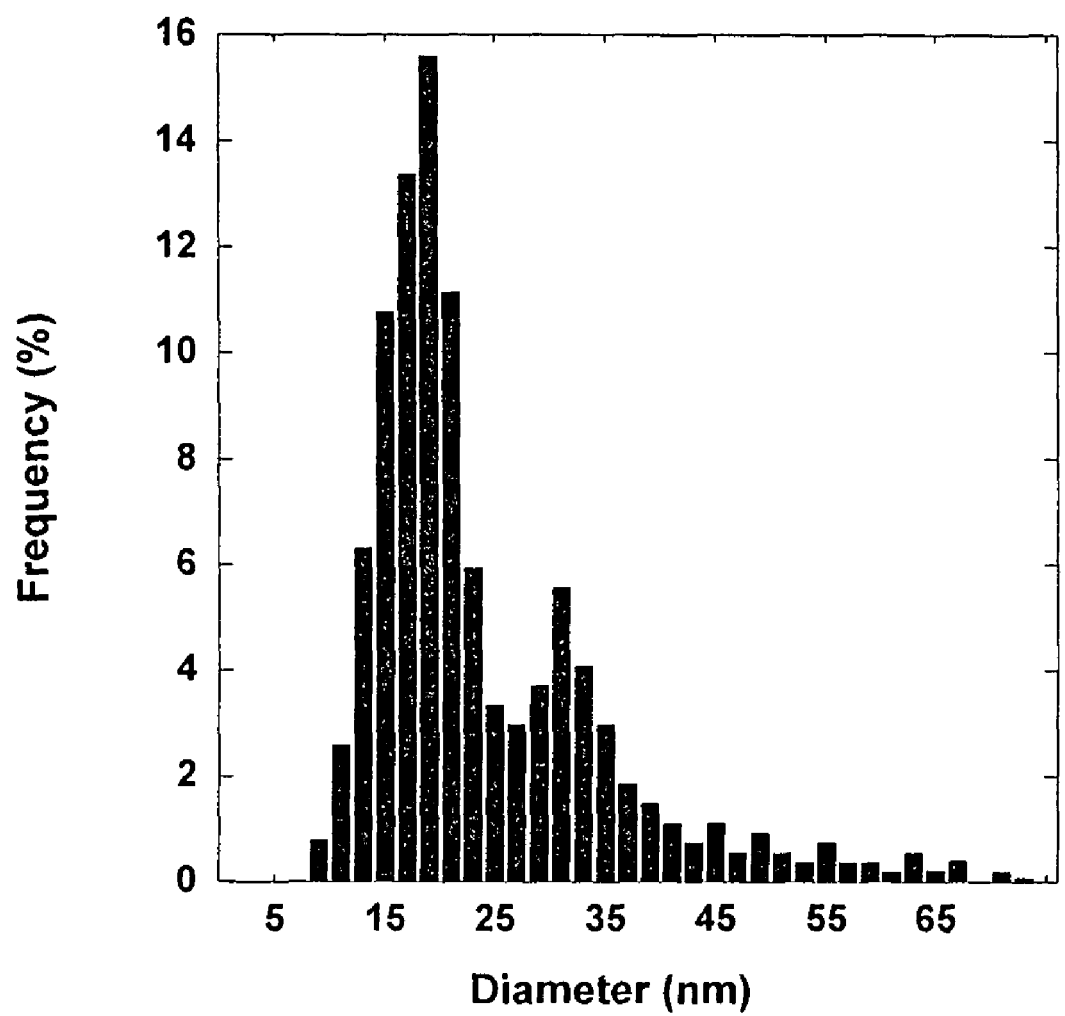
FIG. 7 is a bar graph of diameter distribution of carbon nanotubes.

To obtain a statistically meaningful distribution of nanotube diameters, measurements were taken of the outside diameter of nearly seven hundred nanotubes. FIG. 7 illustrates the resulting histogram for the nanotube diameter distribution. To obtain a probability density function for the nanotube diameter distribution, Levenberg-Marquardt nonlinear regression was used to fit the data to a double Lorentzian distribution and a double Gaussian distribution and the curves were normalized such that the area under the curve is unity. Equations (19) and (20) are the general forms for the double Lorentz and Gauss equations, respectively.

$$\xi(d) = \frac{a_1}{\left(1 + \frac{d-a_2}{a_3}\right)^2} + \frac{a_4}{\left(1 + \frac{d-a_5}{a_6}\right)^2} \quad (19)$$

$$\xi(d) = a_1 e^{\left(-\left(\frac{d-a_2}{a_3}\right)^2\right)} + a_4 e^{\left(-\left(\frac{d-a_5}{a_6}\right)^2\right)} \quad (20)$$

The curve fit parameters for the nanotube diameter distributions are shown in Table 1 where the units for nanotube diameter are expressed in nanometers.

TABLE 1

Curve Fit Parameters for the Diameter Distribution Functions

|  | $a_1$ | $a_2$ | $a_3$ | $a_4$ | $a_5$ | $a_6$ |
| --- | --- | --- | --- | --- | --- | --- |
| Lorentz | 0.8025 | 18.23 | −3.56 | 0.02149 | 31.84 | 2.946 |
| Gauss | 0.0234 | 31.78 | 5.84 | 0.0758 | 18.03 | 5.1176 |

Figure 8:
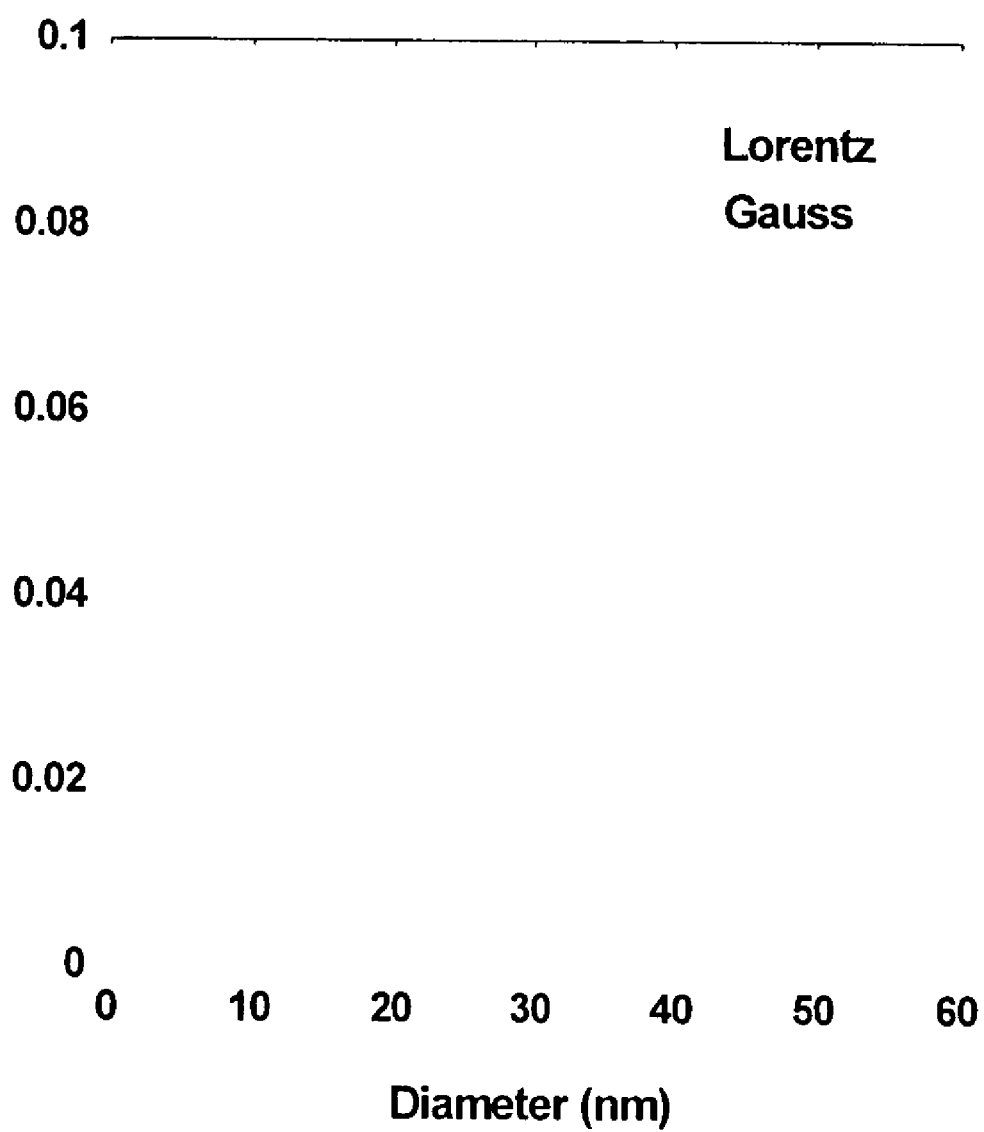
FIG. 8 is a graph of diameter distribution of carbon nanotubes.
Figure 9:
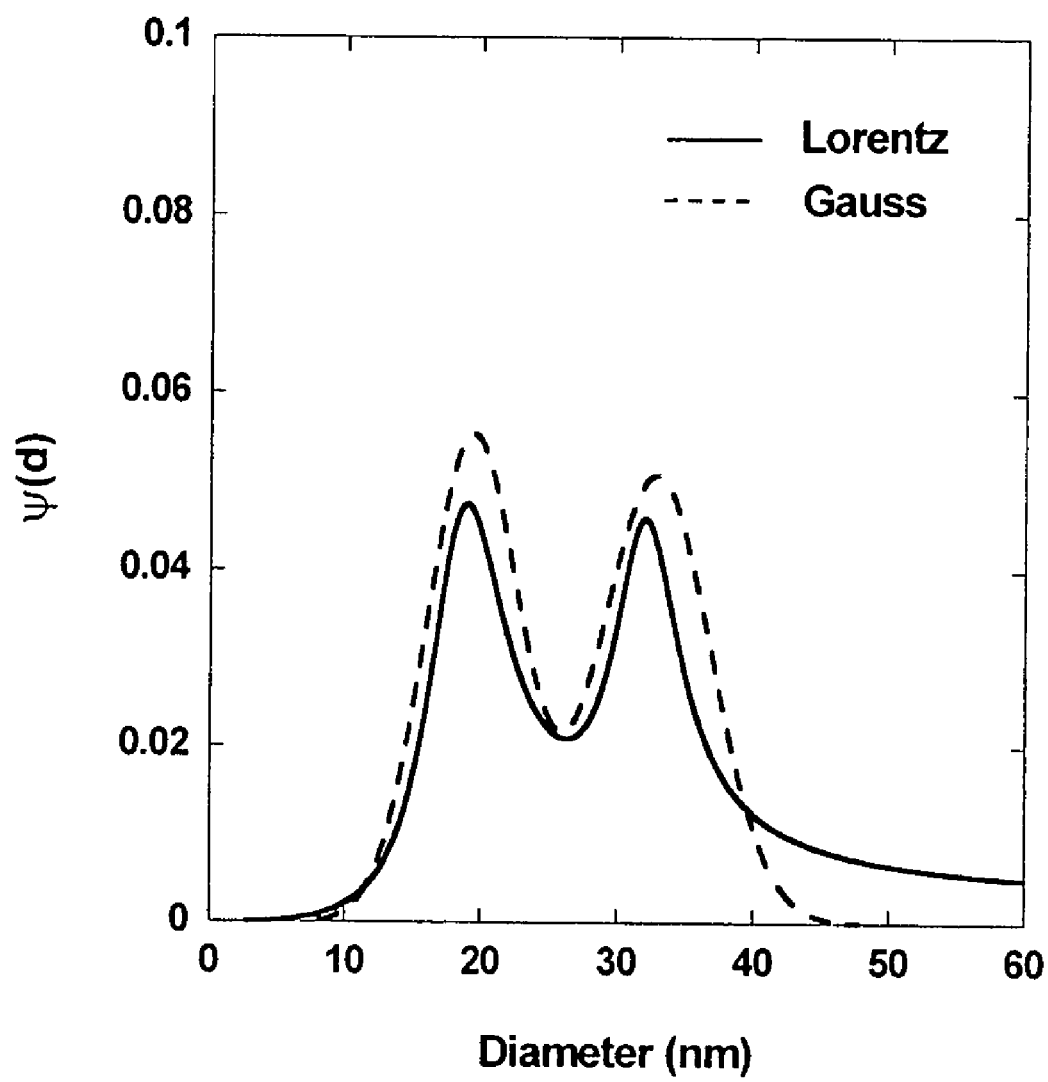
FIG. 9 is a graph of volume distribution of carbon nanotubes.

The Lorentzian and Gaussian probability distributions obtained from the experimental data are shown in FIGS. 8 and 9. For small diameter nanotubes, the Gaussian curve most accurately fits the data, but for large-diameter nanotubes, the Gaussian curve underestimates the amount of nanotubes. As discussed previously, accurate modeling of the distribution at large nanotube diameters is advantageous because the volume occupied by a given nanotube in the composite varies with $d^2$.

FIG. 9 shows plots of volume distributions (Equation (10)) for both the Lorentzian and Gaussian distributions obtained from the experimental data according to the present embodiments. In the volume distribution, the relative area under the curve shifts to the larger diameters. Although the height of the peak at 18 nm is 3 times the height of the peak at 30 nm in the diameter distribution, the two peaks are almost equal in the volume distribution. The Gaussian curve significantly underestimates the large percentage of volume occupied by large nanotube diameters. Although the large diameter nanotubes are a relatively small percentage of the total number of nanotubes, they occupy a significant percentage of volume within the composite. The Lorentzian curve fit overestimates the number of small diameter nanotubes present, but the difference in the volume distribution for the Gauss and Lorentz curves at small nanotube diameter is insignificant.

Figure 10:
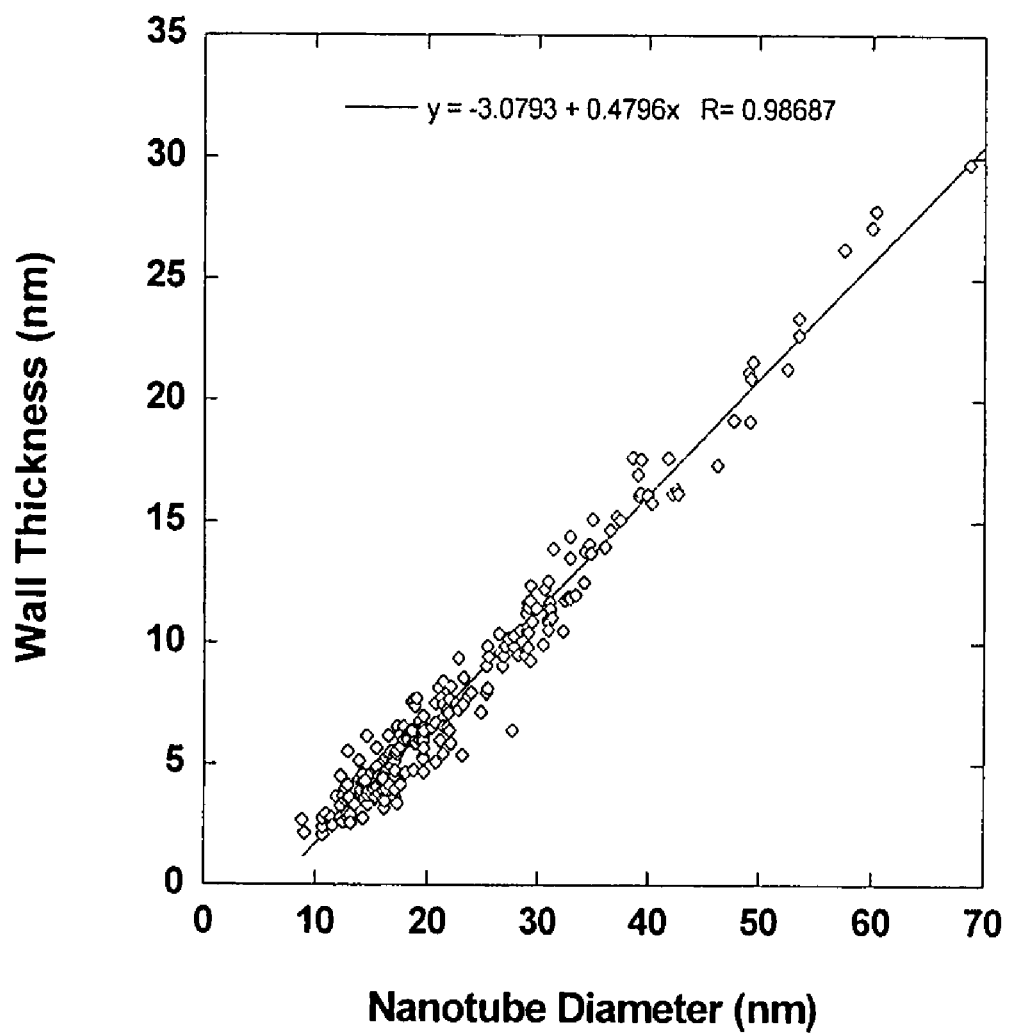
FIG. 10 is a plot of the linear relationship between wall thickness and nanotube diameter.
Figure 11:
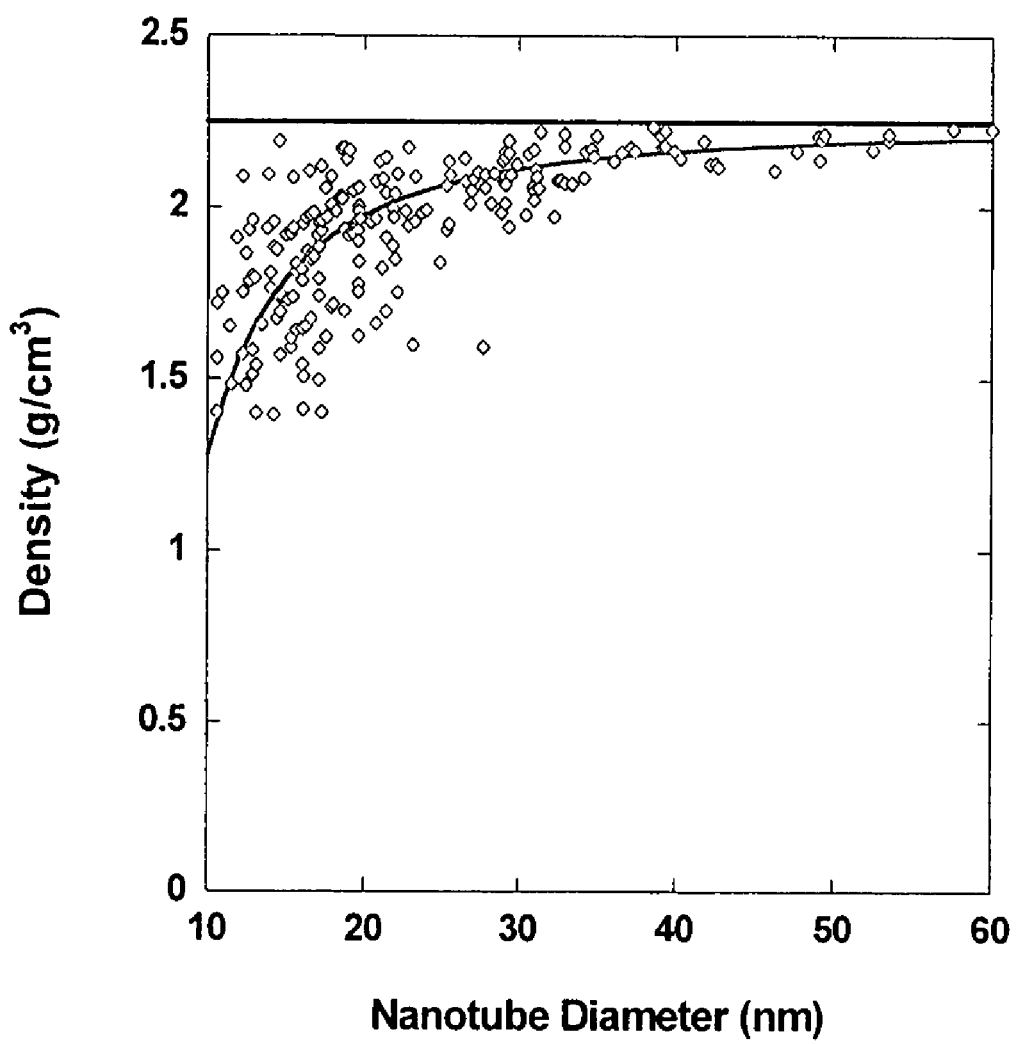
FIG. 11 is a plot of variation in calculated nanotube density with outside diameter.
Figure 12:
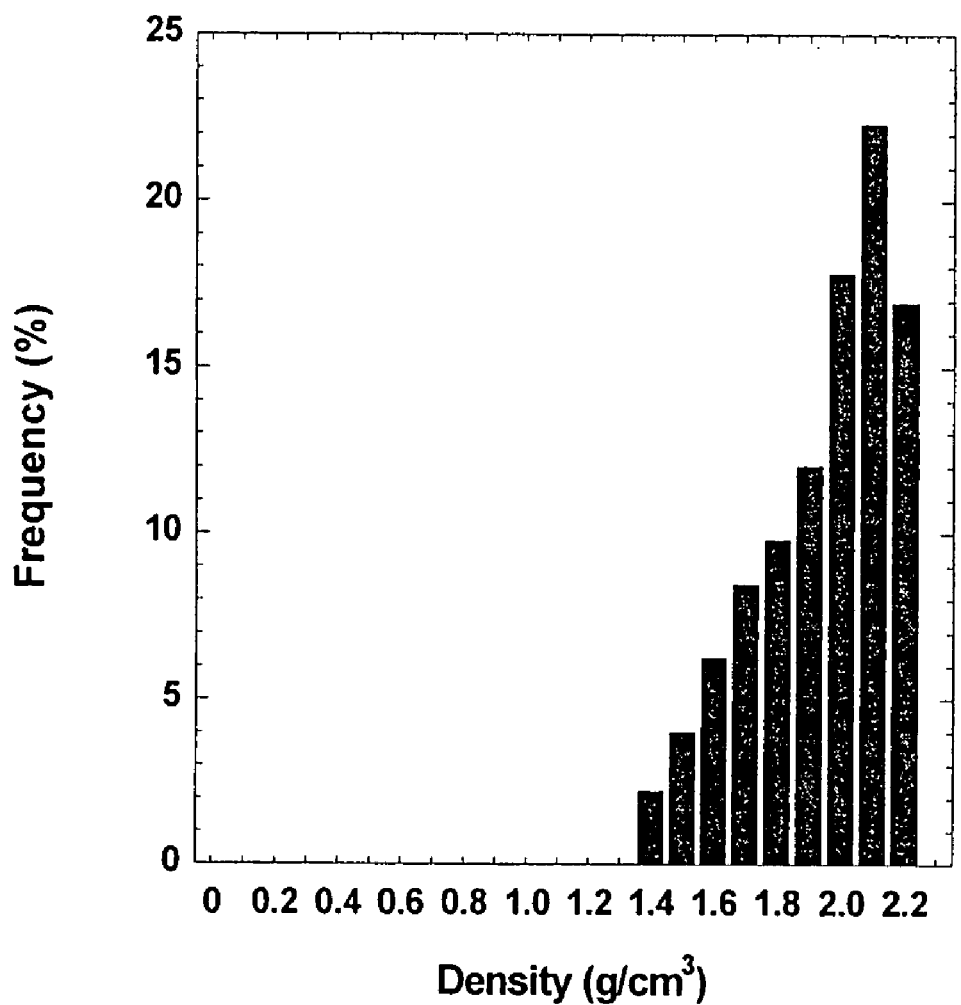
FIG. 12 is a histogram of distribution of nanotube density.

The nanoscale tubular structure of the carbon nanotube also results in a distribution of nanotube density. To calculate the density of nanotubes as a function of nanotube diameter, the outside and inside diameters were measured from TEM micrographs. FIG. 10 is a plot of experimental data, indicating a strong linear relationship between nanotube diameter and wall thickness. At smaller nanotube diameters, the relationship between wall thickness and nanotube diameter begins to deviate from the linear curve fit. Using Equation (14), the density of the nanotubes can be calculated from the experimental data. The nanotube density as a function of diameter is shown in FIG. 11, where the curved line is obtained directly from the straight line in FIG. 10. At larger nanotube diameter, the density of the nanotubes approaches the theoretical density of graphite. FIG. 12 shows the histogram of calculated nanotube density, and the mean density is 1.9 g/cm$^3$.

Figure 13:
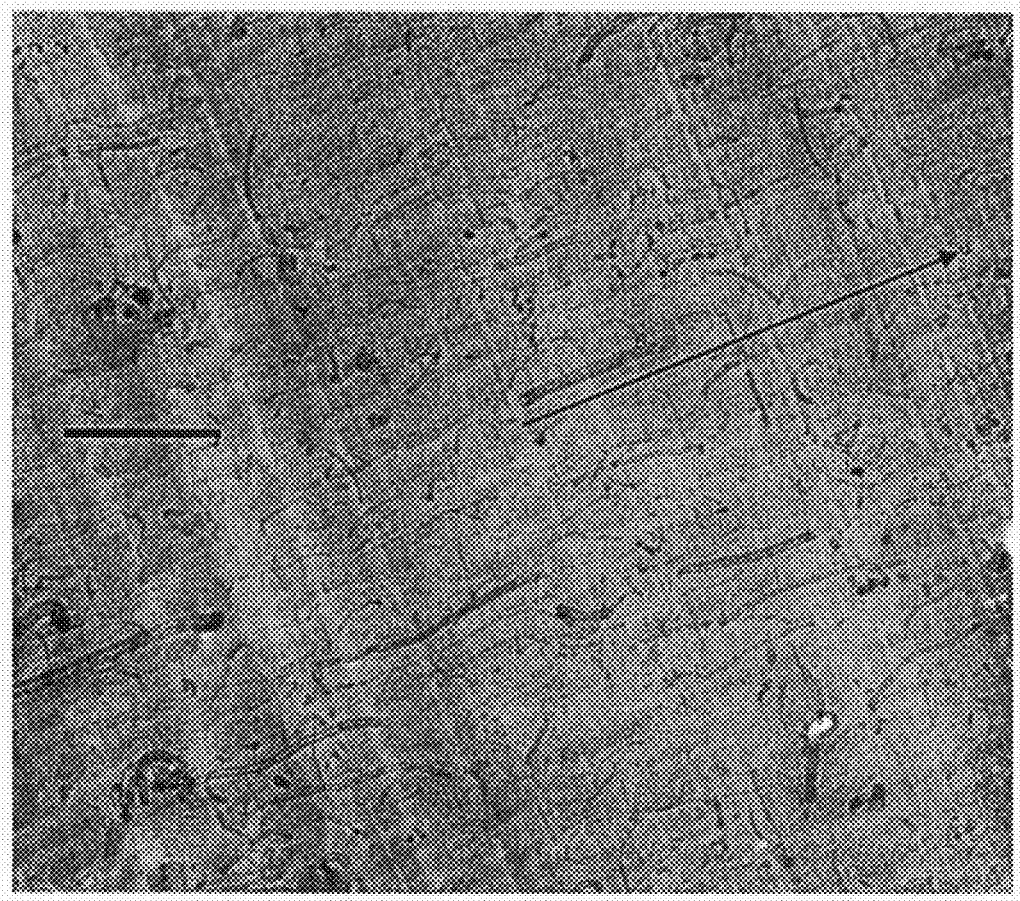
FIG. 13 is a micrograph of process-induced alignment of nanotubes in a model nanocomposite system according to an embodiment of the present invention.

FIG. 13 is a TEM micrograph of as-processed 5 wt. % nanocomposite film showing large-scale dispersion and alignment of carbon nanotubes in a polymer matrix according to the present embodiments. The arrow indicates the direction of alignment taken as the principal material direction with a nanotube orientation of 0°. The gray lines perpendicular to the arrow in the TEM micrograph are artifacts from the microtome cutting process and indicate that the film was cut normal to the direction of orientation. To quantify the degree of alignment in the nanocomposite films, image analysis was performed on the micrographs to examine the nanotube orientation. To avoid significant distortion of the nanocomposite structure from the microtome cutting process, the samples were relatively thick (200 nm) for TEM. However, the cutting process resulted in some local distortion of the nanocomposite structure.

Figures 14A, 14B:
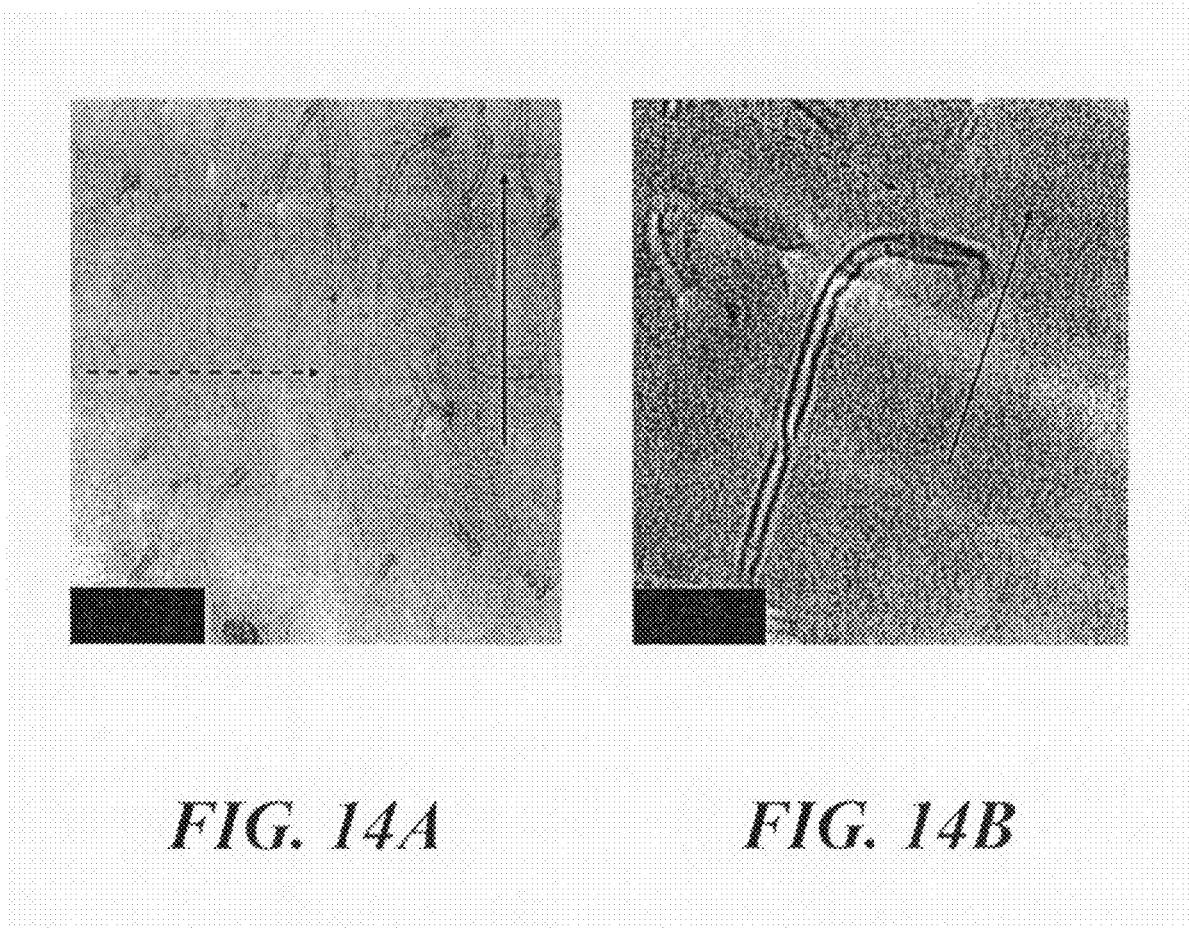
FIGS. 14A and 14B are TEM micrographs showing local distortion of the nanotube composite because of the microtome cutting process.

FIGS. 14A and 14B are higher-magnification TEM images that show local distortion in a nanocomposite film according to the present embodiments. FIG. 14A shows nanoscale alignment of the film in the direction indicated by the solid arrow, but near the nanotube ends, it can be seen that the tubes are sharply bent to the right (FIG. 14B). This local distortion is a consequence of cutting across the nanocomposite film where the diamond knife cuts through a nanotube. The darker regions seen at some of the nanotube ends indicates that the tube has been cut. Based on the common direction that the cut nanotubes are bent, it is reasonable to infer that the cutting direction is from left to right in FIG. 14A. The cutting direction is indicated by the dashed arrows.

To analyze the orientation of the nanotubes in the films, the direction of orientation is taken as the primary axis of the tube and the curvature at the nanotube end, which is simply an artifact of the cutting process, is ignored. In addition, tube fragments that are shorter than 200 nm are ignored in the image analysis.

Figure 15:
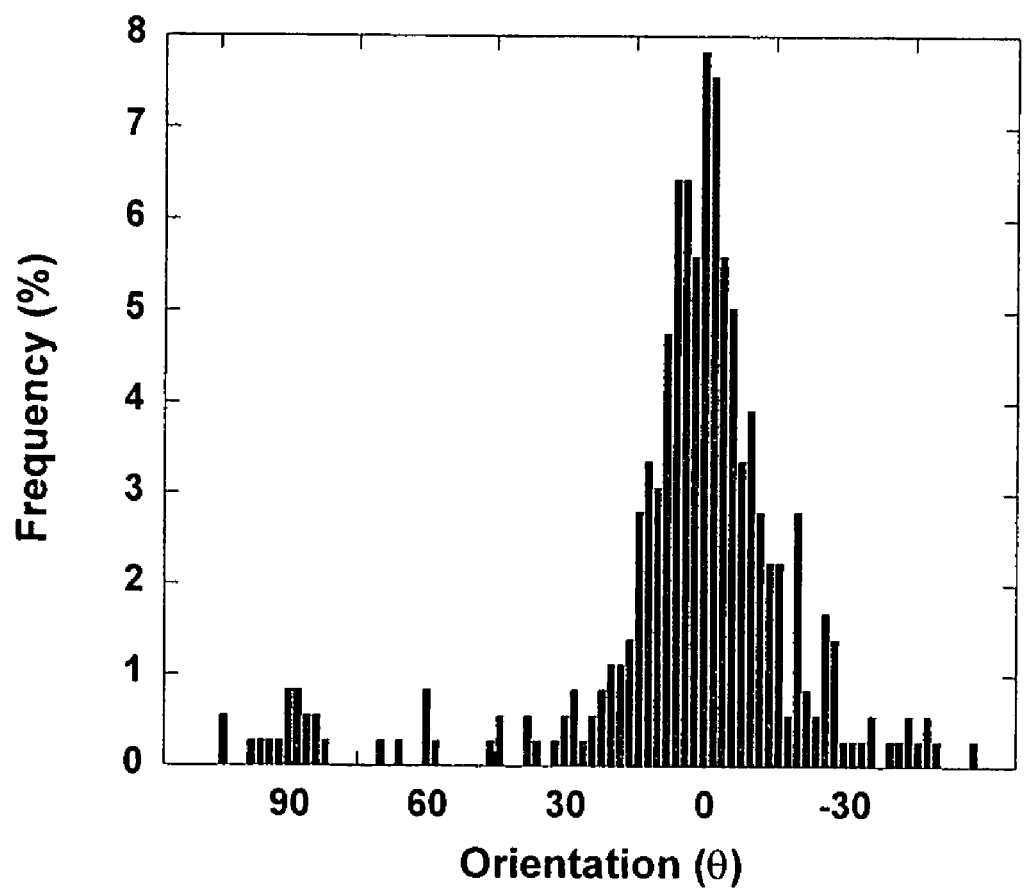
FIG. 15 is an image analysis showing the alignment of carbon nanotubes along the principal material direction.

FIG. 15 shows the distribution of nanotube alignment based on the image analysis. The slight peak in the nanotube distribution at 90° is likely a consequence of damage induced by the microtome cutting. Based on the data, the standard deviation of nanotube alignment from the principal material direction is less than ±15°.

Figure 16:
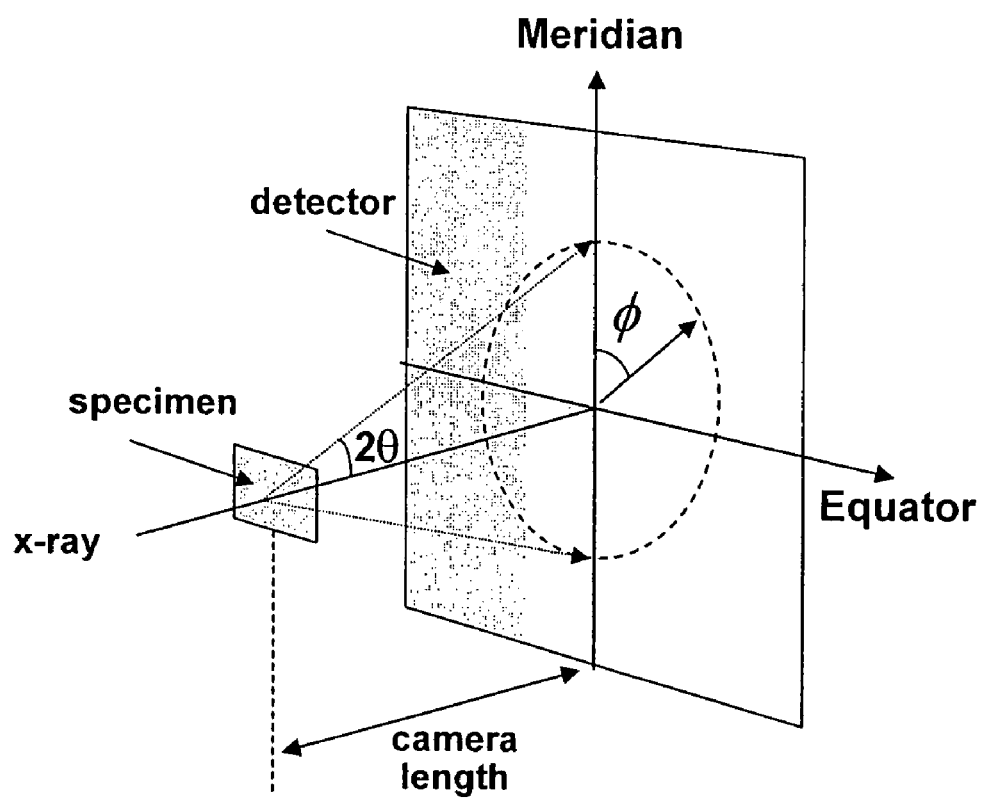
FIG. 16 illustrates the geometry for two-dimensional x-ray scattering in transmission mode.

X-ray diffraction and polarized Raman spectroscopy may be used to probe the degree of orientation of carbon nanotubes. Although electron microscopy is effective in directly investigating the nanoscale structure and orientation in nanotube-based composites, TEM is only able to survey very small volumes of the overall specimen. The thickness of the as-microtomed sections is approximately 200 nm (0.2 μm), and for adequate image resolution the largest area over which a TEM micrograph can be taken is on the order, of a few square microns. In x-ray scattering, the incident beam interacts with a much larger volume of material and the scattering behavior can be is utilized to gain insight into the micro and nanoscale structure of the composite. FIG. 16 illustrates the geometry for two-dimensional x-ray scattering in transmission mode. In the small-angle regime, the scattering involves regions of different electron densities, and small-angle scattering arises from the difference between the electron densities between the nanotube and the polymer matrix. Randomly oriented specimens result in isotropic scattering and a specific reflection will show up as a circular ring in the two-dimensional scattering pattern. For an aligned system the ring will break up into arcs along the circumference of the ring, known as the azimuthal direction φ. The reflection for a perfectly aligned system would be represented as a single point on the ring circumference. The two-dimensional scattering patterns can be subsequently integrated to obtain one-dimensional scattering (intensity vs. 2θ) and texture (intensity vs. φ) profiles.

The SAXS and WAXS investigations were performed in transmission mode using point collimation and data were collected on a two-dimensional CCD detector. Wide-angle measurements were made with Cu Kα radiation (λ=0.15405 nm) and small-angle measurements were performed with incident radiation from the National Synchrotron Light Source at Brookhaven National Laboratory (λ=0.1548 nm). For measurements on aligned and random nanocomposites, the films were laminated by stacking pieces of the film and sandwiching them between layers of Kapton polyimide tape. Measurements were also performed on the Kapton tape and the scattering background was removed.

At small angles, the length scale in nanotubes probed via x-ray scattering corresponds to the carbon nanotube diameters and can be used to examine the flow-induced orientation. Nanotube curvature, bamboo-like defects, distribution in nanotube diameters, and variations in the number of concentric nanotubes complicate the scattering represented by the diameter of a multi-walled carbon nanotubes.

Figure 17:
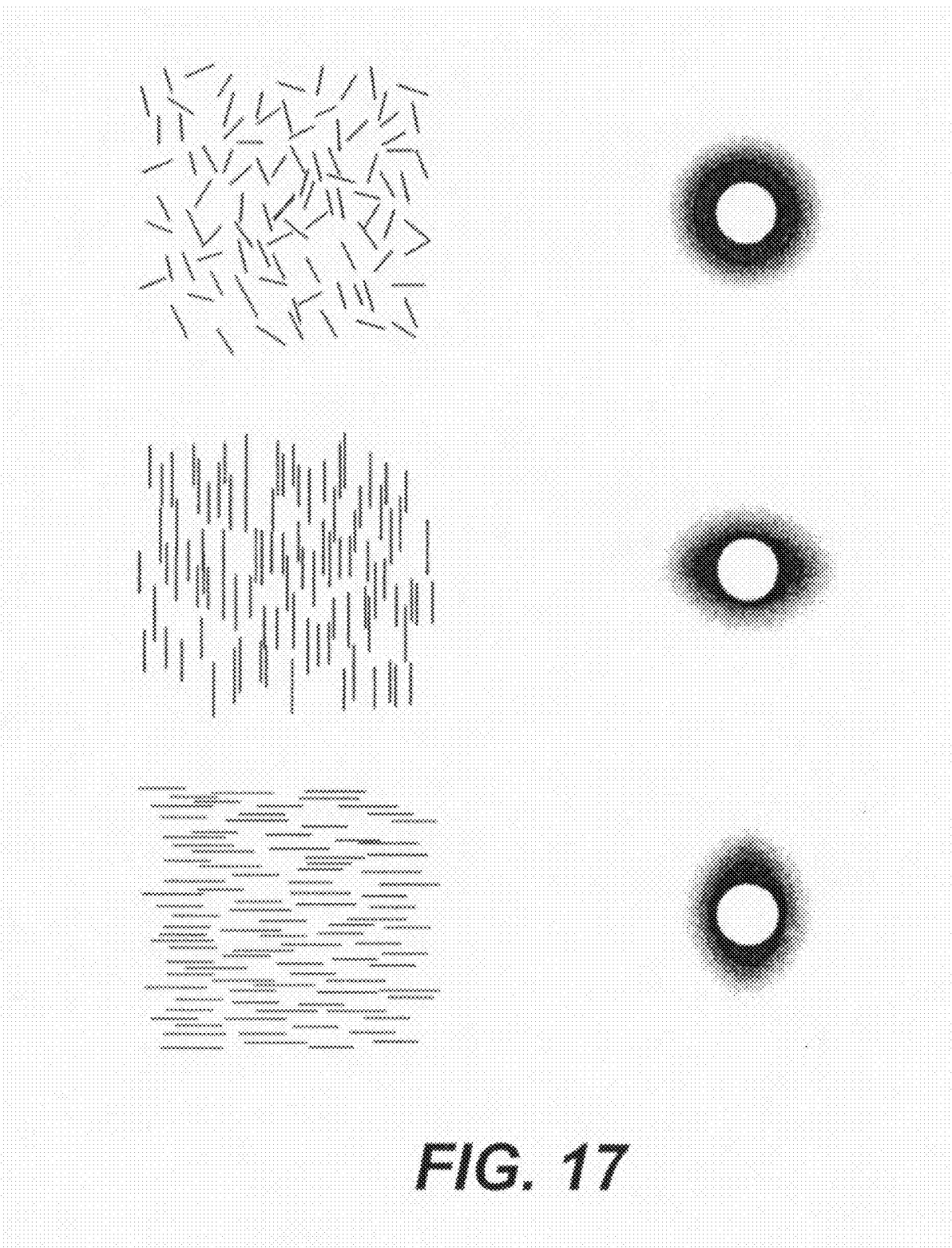
FIG. 17 shows schematics of the nanocomposite structures and the related two-dimensional scattering patterns.

Scattering measurements were performed on aligned and random nanocomposites as well as drawn polystyrene films. The specimens were rotated and translated between scans to ensure that the observed anisotropy in scattering was related to the bulk nanocomposite structure. FIG. 17 shows schematics of the nanocomposite structure as observed via TEM and the related two-dimensional scattering patterns. The randomly oriented nanocomposite specimens (prepared by hot-pressing the dispersed nanocomposite into a film) show an isotropic, circular scattering pattern. The aligned nanocomposite specimens show anisotropic scattering. When the aligned nanocomposite specimens are oriented along the detector meridian or equator there is increased scattering in direction normal to the orientation, indicating that there is significant alignment of the carbon nanotubes.

Figure 18:
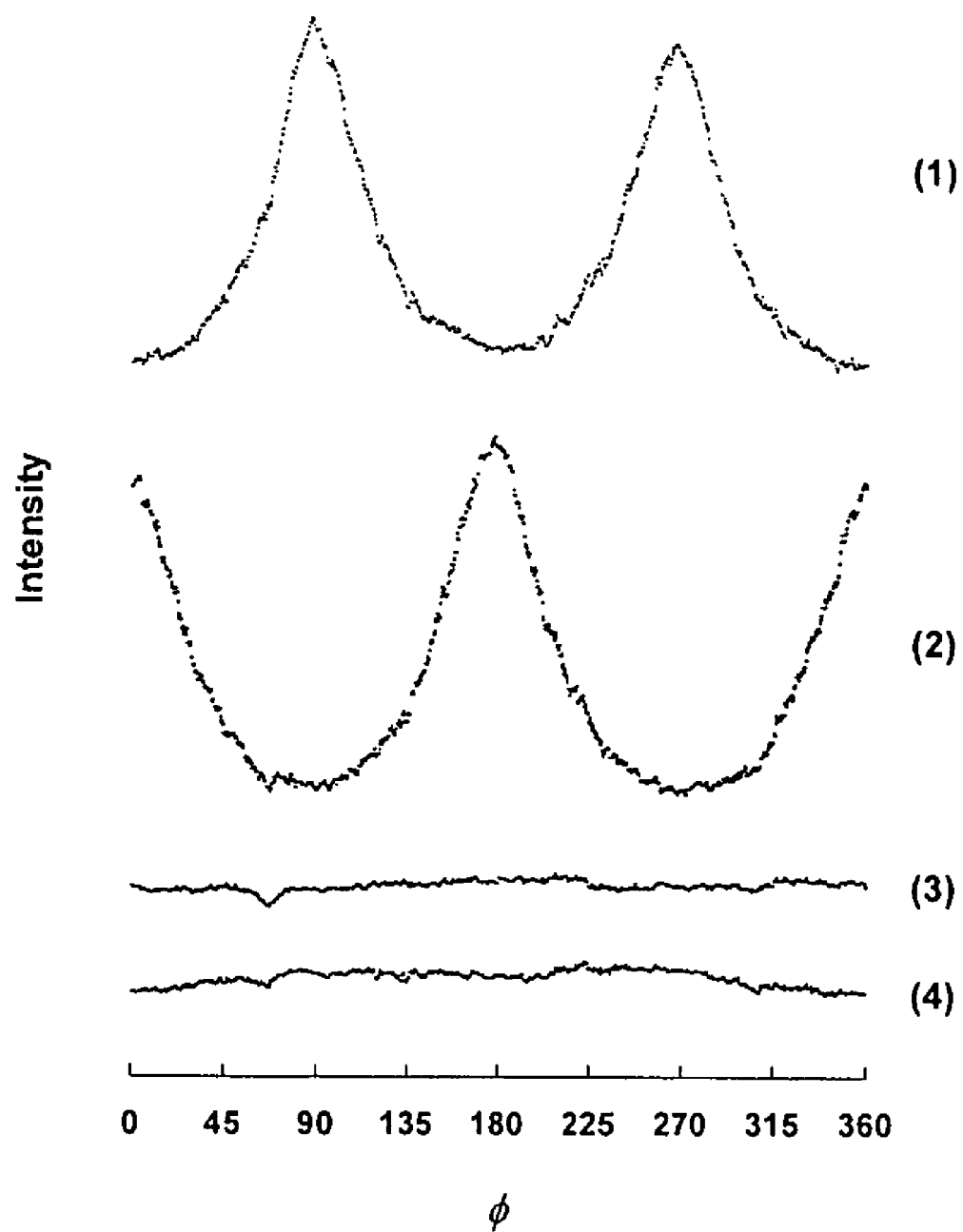
FIG. 18 shows the two-dimensional scattering data integrated in the radial direction.

FIG. 18 shows the two-dimensional scattering data integrated in the radial direction to examine the anisotropy of the different specimens. The one-dimensional texture profiles for the aligned nanocomposites are quite anisotropic, showing distinct peaks that are centered 90 from the direction of nanotube orientation. This highly anisotropic texture indicates a significant amount of flow-induced orientation. For both the random nanocomposite and drawn polystyrene, the intensity along azimuthal angle is relatively constant and indicates that both films are essentially isotropic.

The TEM and x-ray diffraction results confirm experimentally that the processing according to the present embodiments result in a highly dispersed and aligned nanocomposite film.

In addition to nanotube orientation, nanotube length is an important parameter. Variation in nanotube length is difficult to quantify from TEM analysis, because a large number of nanotubes are severed when cutting the specimen with a microtome. The lengths of a majority of the nanotubes in the as-processed composite appear to range between 500 nm and 2 μm, with the average length being above 1 μm.

Figure 19:
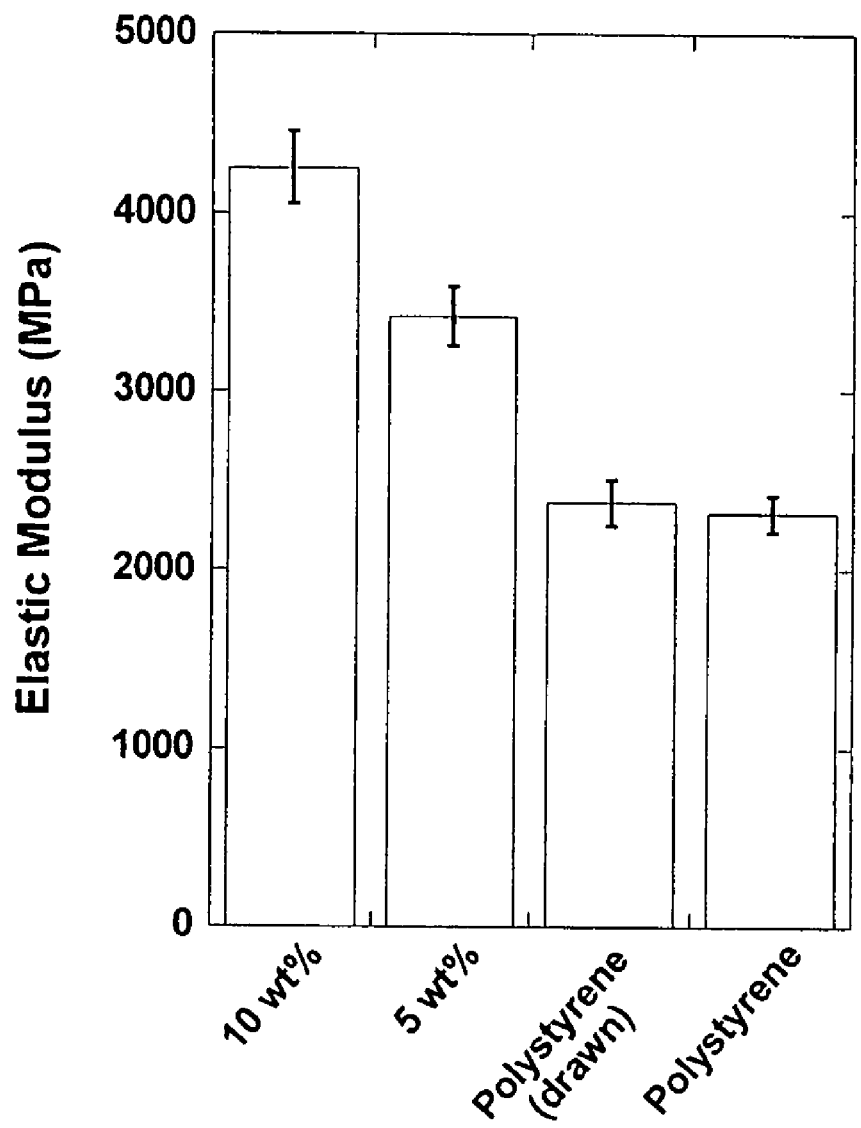
FIG. 19 is a bar graph of average elastic modulus results at 25° C.

With knowledge of both the nanotube and nanocomposite structures, the micromechanical model developed above can be used to predict the properties of the model nanocomposite system. To compare the predictions for nanotube tensile modulus with the model composite systems, aligned nanocomposite films with 5 and 10 wt % nanotubes and unreinforced polystyrene films that were drawn from the melt and prepared with a hot press have been characterized using a Dynamic Mechanical Analyzer (DMA 2980-TA Instruments) in constant frequency mode (1 Hz, 5° C./min). FIG. 19 summarizes the values obtained for the average elastic storage modulus for nanocomposite films and unreinforced polystyrene at 25° C. Polystyrene, an amorphous polymer, was chosen for the matrix material because the influence of drawing on elastic modulus would be negligible, enabling the direct examination of nanotube reinforcement on the composite elastic properties. Drawing of the polystyrene film resulted in a slight average increase in elastic modulus, but the modulus results for the drawn and hot-pressed specimens are within experimental scatter. Thus, the increase in elastic modulus between the random and aligned nanocomposite is a consequence of load transfer to the nanotubes, not polymer chain orientation.

Figure 20:
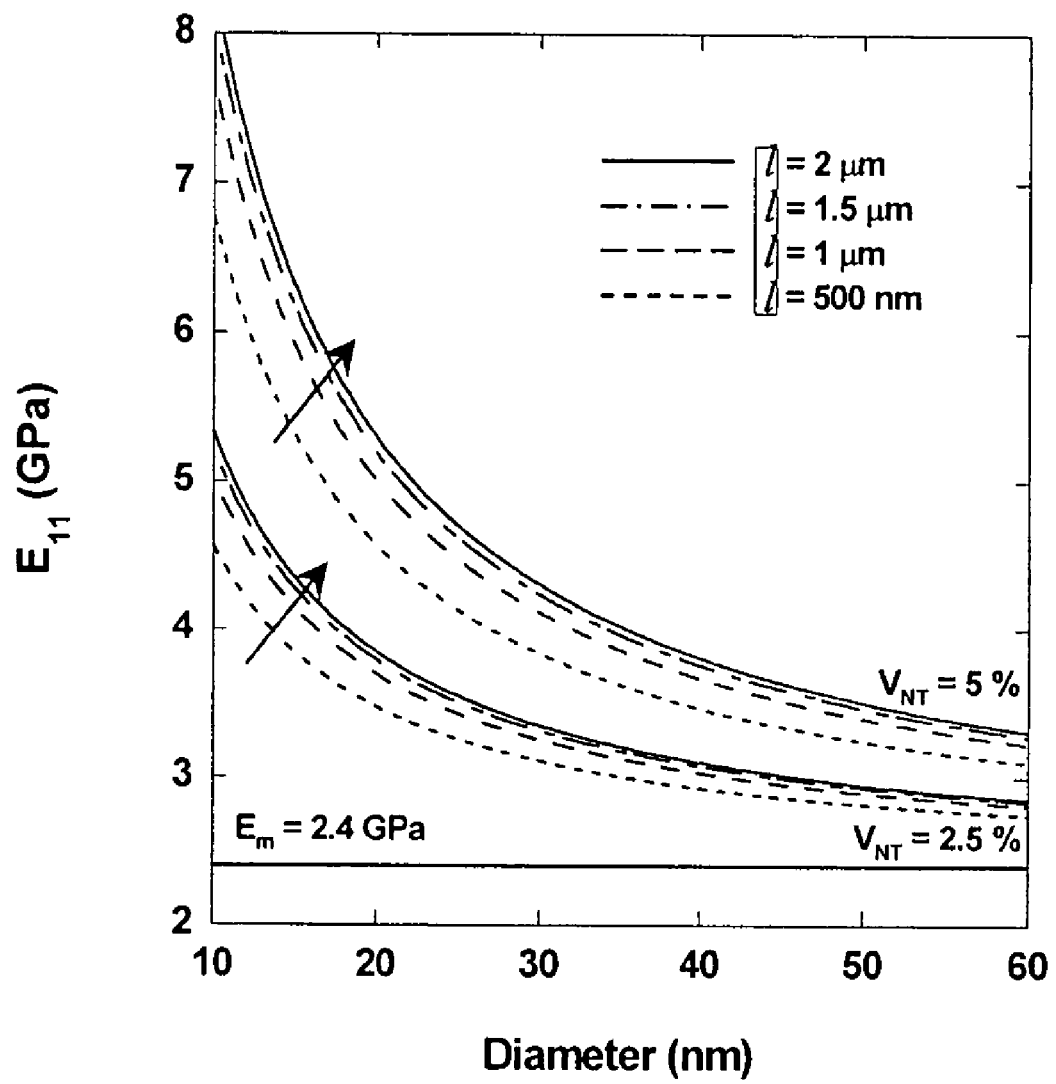
FIG. 20 is a plot of the influence of nanotube diameter, volume fraction and length on the elastic properties of an aligned nanocomposite system.

For input into the micromechanical model, the modulus of the nanotube, $E_{NT}$, is assumed to be 1 TPa and the modulus of the matrix, from the characterization results for unreinforced polystyrene is taken at 2.4 GPa. FIG. 20 shows the influence of nanotube diameter, length and volume fraction on the composite elastic modulus as predicted by Equation (9). While there is a slight increase in elastic modulus at a given nanotube diameter and volume fraction with increasing nanotube length, the diameter of the nanotubes plays the most significant role in the composite elastic modulus. This strong diameter-dependence of the composite elastic modulus highlights the need to accurately model the dispersion of nanotube diameters in the composite.

Figure 21:
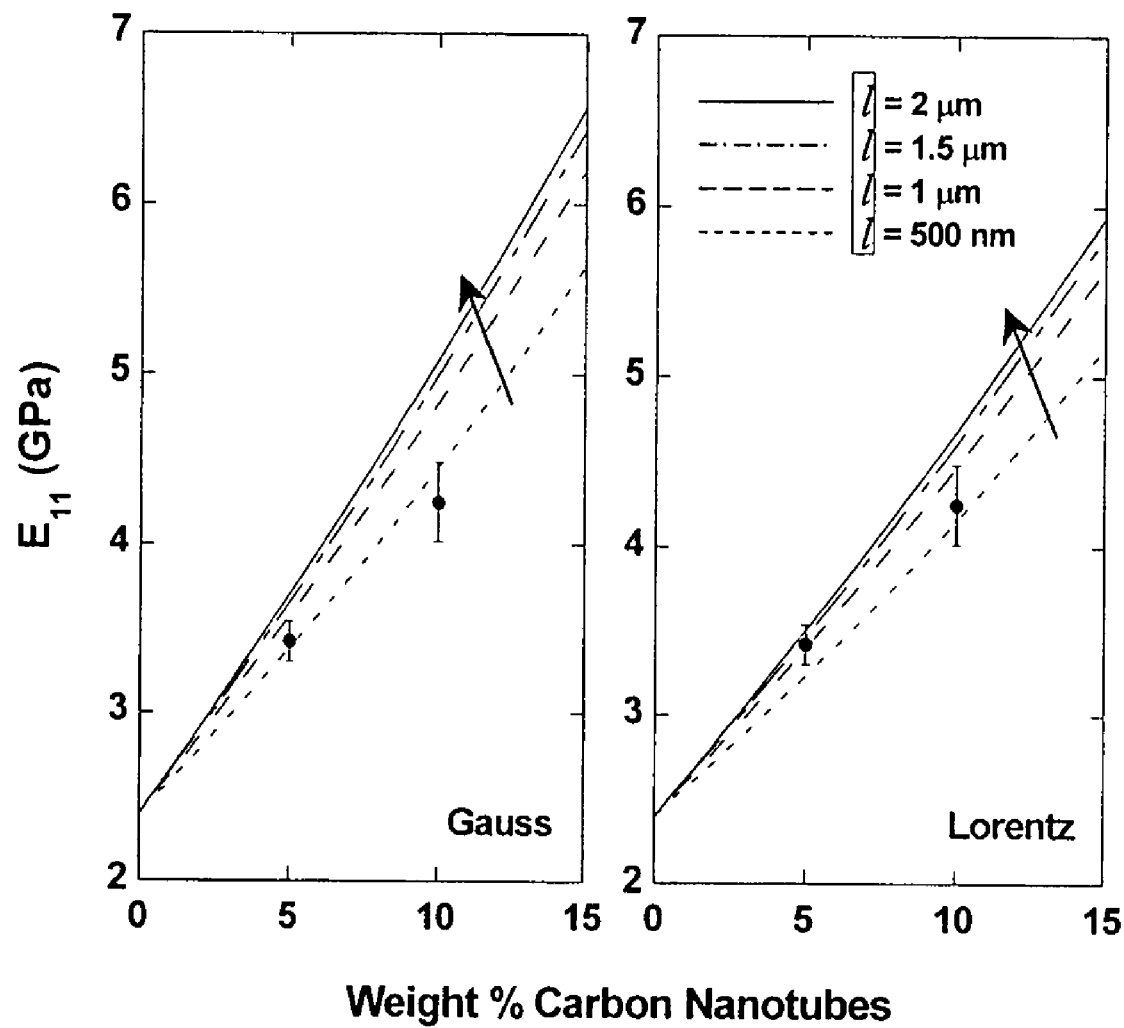
FIG. 21 illustrates the influence of nanotube weight percentage, length and diameter distribution on the elastic modulus of nanotube composites.

To illustrate the importance of modeling the nanotube diameter distribution, the modeling processes discussed above were used in combination with the structural characterization of the model composite to predict the elastic properties of the composite as a function of the nanotube weight %. For conversion of weight loading of nanotubes to volume loading, the density of the matrix was assumed to be 1 g/cm³. FIG. 21 shows a direct comparison of the calculated nanotube elastic modulus of varying length nanotubes with the experimental results. For the Lorentz distributions, the calculated elastic modulus compares quite well with the results from the experimental characterization. The Gauss distribution, which ignores the contribution of the larger diameter nanotubes, results in an overestimation of the composite elastic modulus, particularly at higher loading fractions.

Specific examples of the production of nanocomposites will now be discussed.

EXAMPLE 1

A micro-scale twin-screw extruder was used to obtain high shear mixing necessary to disentangle CVD-grown multi-walled nanotubes and to disperse them uniformly in a polystyrene thermoplastic matrix.

The polymer melt was then extruded through a rectangular die and drawn under tension before solidification. The process of extruding the nanocomposite through the die and subsequent drawing resulted in a continuous ribbon of aligned nanocomposites. These aligned nanocomposite films could be subsequently laminated using traditional composites processing techniques such as autoclave or tape placement techniques to create macro-scale aligned nanocomposites.

The structure of the films was investigated using electron microscopy and the tensile behavior characterized using a dynamic mechanical analyzer.

The micro-scale twin-screw extruder can be used to achieve dispersion of multi-walled carbon nanotubes in a thermoplastic/thermoset polymer matrix. In the present examples a polystyrene matrix was used, but the other thermoplastic/thermoset polymer matrix mixes may also be used.

Randomly oriented nanocomposites were also produced by achieving dispersion first with the twin-screw extruder, followed by pressing a film using a hydraulic press.

The tensile behavior of both the aligned and random nanocomposite films with 5 wt. % loading of nanotubes were characterized. Addition of nanotubes increased the tensile modulus, yield strength, and ultimate strengths of the polymer films. The improvement in elastic modulus with the aligned nanotube composite is 5 times greater than the randomly oriented composite.

EXAMPLE 2

In another embodiment, carbon nanotubes were first dispersed in a solvent and placed in a sonicator bath for mixing. The mixture was sonicated for at least 15 minutes. Under continued sonication, a polymer compatible with the solvent was slowly added to the nanotube/solvent mixture until completely dissolved. The nanotube/solvent/polymer was sonicated for at least 15 minutes until enough solvent evaporated to form a viscous mixture. The solvent was then allowed to evaporate and the remaining nanotube/polymer mixture was dried in a vacuum oven.

After drying, the nanotube/polymer solids were fed into a twin-screw extruder and the temperature, mixing rate, and mixing time were specified to obtain high shear stresses in the extruder flow. The molten polymer was then extruded through a die and drawn under tension to form a continuous ribbon of the polymer/nanotube mixture.

Figure 23:
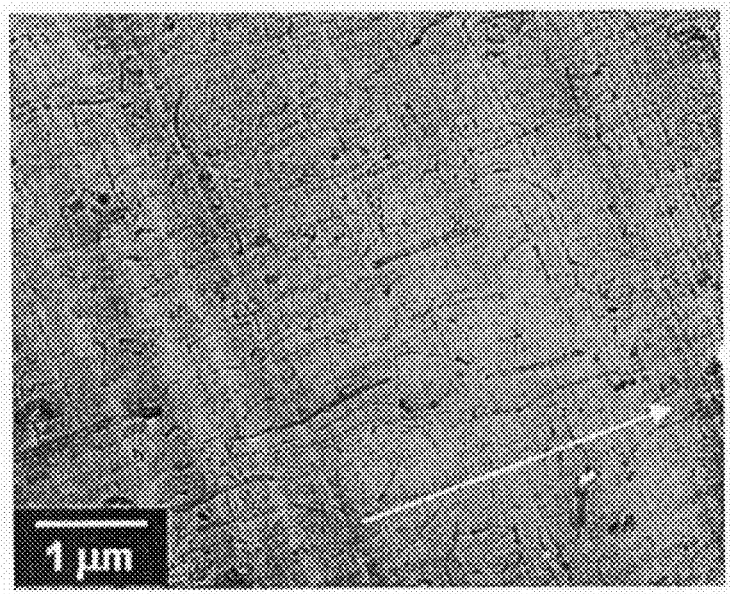
FIG. 23 is a TEM micrograph of the cross-section of a polymer composite where the nanotubes are uniformly dispersed and aligned in a primary direction according to an embodiment of the present invention.

Resulting electron microscopy shows both dispersion of the carbon nanotubes and alignment in a primary direction. FIGS. 22A and 22A show the bulk carbon nanotubes that are entangled and form large agglomerates on the millimeter or micrometer scales. FIG. 23 shows the cross-section of a polymer composite where the nanotubes are uniformly dispersed and aligned in a primary direction (the white arrow indicates the direction of orientation.

Although this technique was developed for a thermoplastic polymer (polymers that melt and flow when heated), it is also applicable to thermoset materials (polymers that react when heated and become more solid) where the viscosity of the thermoset material at the processing temperature is high enough (such as with a partially cured or b-staged thermoset) to undergo the same shear and extensional flow stresses.

On a larger scale, it may be possible to eliminate the step of solvent polymer/nanotube/solvent mixing and obtain mixing, dispersion and alignment in a single step. The process of extruding the nanocomposite through the die and subsequent drawing results in a continuous ribbon of aligned nanocomposite with uniform dispersion of carbon nanotubes. These aligned nanocomposite films could be subsequently laminated using traditional composites processing techniques (e.g. autoclave or tape placement techniques) to create macro-scale aligned nanocomposites or nanoscale devices.

EXAMPLE 3

To disperse CVD-grown multi-walled carbon nanotubes in a polystyrene matrix, a micro-scale twin-screw extruder (DACA Instruments—Goleta, Calif.) was used to obtain the high shear mixing necessary to disentangle and disperse the nanotubes.

To obtain tight control over the weight fraction of nanotubes within the polymer and minimize exposure to nanotubes that become airborne, 3.5 g of polystyrene (280 K $M_w$—Scientific Polymer, Inc) was dissolved in tetrahydrofuran (THF) and mixed with 184.2 mg of nanotube powder.

The solution was cast in a petri dish and sonicated as the solvent was evaporated. The purpose of sonication was not to enhance the nano-scale dispersion of nanotubes within the polymer but rather to assure the nanotubes were dispersed on the microscale so that they are encapsulated within the polymer after evaporation of the solvent.

After drying, the mixture of nanotubes and polymer was then fed into the extruder, which was pre-heated to 155° C., and the polymer was melted and subsequently mixed for three minutes at a screw speed of 100 RPM to disperse the nanotubes within the matrix.

The polymer melt was then extruded through a rectangular die (w=13 mm, t=0.35 mm). As the polymer melt exited the die, the film was drawn in the molten state at various take-up rates and passed-over a chill roll to solidify.

The drawn length and mass flow rate was recorded during the extrusion process to ensure consistent draw ratios from batch-to-batch. The as-drawn films ranged between 80 and 120 microns in thickness, depending on the draw ratio.

Unreinforced polystyrene films were also processed using the same technique and draw ratios. To understand the influence of drawing on the properties of the polymer and nanocomposite, specimens were also produced without drawing by compounding the material in the extruder followed by molding of the film in a hot press.

EXAMPLE 4

To achieve a homogeneous distribution of nanotubes in the polystyrene matrix, a processing method was developed that combines solvent-assisted dispersion of nanotubes in the polymer followed by shear mixing of the polymer melt using a micro-scale twin-screw extruder. Aligned nanocomposite films were formed by subsequently drawing the molten polymer prior to solidification, and the extensional flow from drawing results in significant flow-induced alignment of nanotubes. Optimum processing parameters (mixing time, shear stress, draw ratio) to achieve a high degree of dispersion and alignment were determined experimentally by processing nanocomposite films using the micro-scale extruder and investigating the micro and nano-scale structure using transmission electron microscopy.

Figure 24:
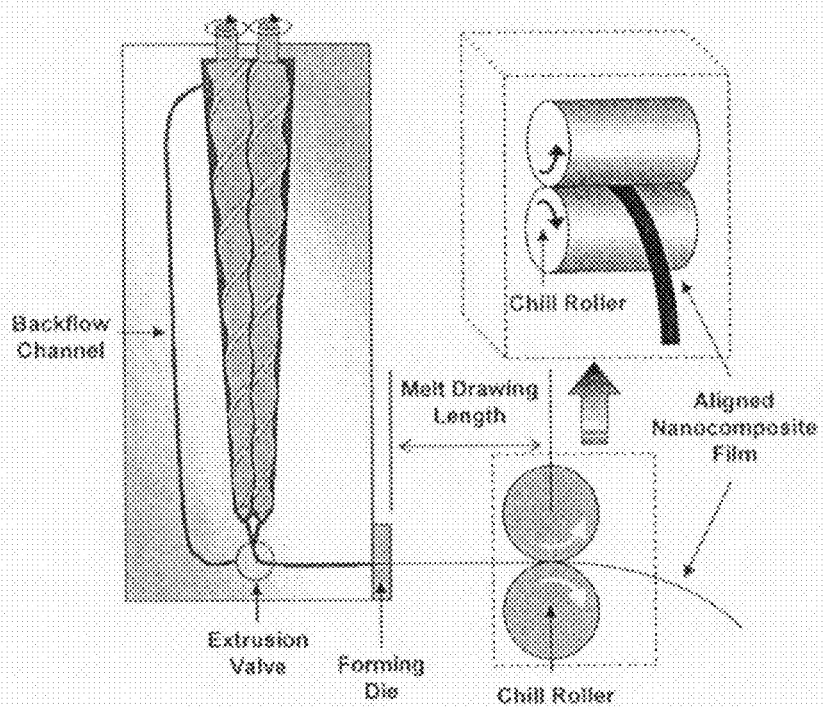
FIG. 24 is a schematic diagram showing the configuration of a micro-scale twin-screw extruder and the apparatus for drawing films from polymer melt.

FIG. 24 is a schematic diagram of the micro-scale extrusion system (DACA Instruments—Goleta, Calif.). Unlike a traditional twin-screw extruder, where the length of the screws, and hence mixing time, are fixed, the design of the micro scale extruder used in this work utilizes conical-shaped co-rotating screws that are 10 cm in length in combination with a backflow channel that allows re-circulation of the polymer through the extruder barrel. This capability for continuous mixing enables small batches of model nanocomposites to be processed with flexible mixing times. The total volume of the extruder barrel and backflow channel is 5 cm$^3$.

After shear mixing, the extrusion valve is turned so that the polymer flows out of the extruder through a forming die (FIG. 24). Extruding the polymer through a rectangular forming die produces a film that can be drawn in the molten state by varying the take-up rate as the film passes over the chill roller. The drawing length is fixed at 1.6 cm and the take-up rate is continuously variable up to 175 cm/minute.

Due to the limited quantity of carbon nanotubes available, two compositions were investigated for the model nanocomposites (5 and 10 wt %). The nanocomposites were prepared by first dispersing the carbon nanotubes in tetrahydrofuran (THF) using a low energy ultrasonic mixing bath (80 W, 47 kHz). Prior to dispersion, large agglomerates of carbon nanotubes were broken-up using a mortar and pestle. After sonic mixing for at least 45 minutes, 3.5 g of polystyrene was slowly dissolved and, after continued ultrasonic mixing of the polymer/nanotube solution, the solvent was evaporated. The mixture was further dried in air at 60° C. for four hours and under vacuum at 80° C. for two hours to remove any residual solvent.

Solvent-assisted dispersion of nanotubes in the polymer enables tight control over the nanotube weight fraction and also minimizes exposure to nanotubes that may become airborne. The purpose of sonication was not to enhance the nano-scale dispersion of nanotubes within the polystyrene but rather to assure that the nanotubes were dispersed on the micro-scale. This micro-scale dispersion of nanotubes ensures that the nanotubes are completely encapsulated within the polymer after evaporation of the solvent.

After drying, the polymer/nanotube mixture was then compounded using the micro-scale extruder. Because micro-scale extrusion is a batch process, the flow rate during extrusion of the films does not remain constant; the flow rate decreases over time because the barrel pressure decreases as polymer is extruded.

Figure 25:
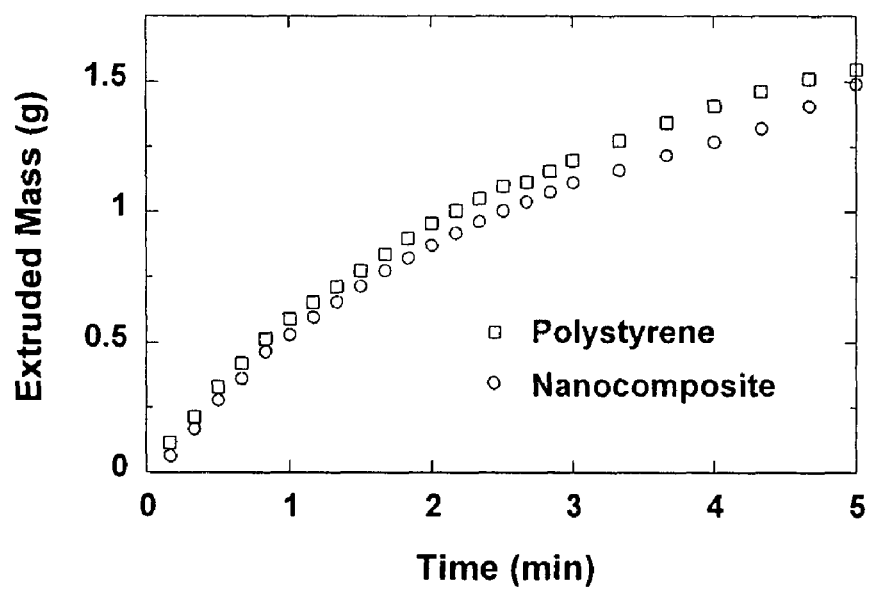
FIG. 25 illustrates the mass extruded from the barrel during the formation of both nanocomposite and polymer films.

FIG. 25 shows the mass extruded from the barrel during the formation of both nanocomposite and polymer films. For controlled drawing of the films, the mass of polymer compounded was kept constant (3.5 g) for all experiments, and the drawn length and mass flow rate was recorded during the extrusion process to ensure consistent draw ratios from batch-to-batch. During the first minute of extrusion, the flow rate is the highest and relatively constant at 0.6 grams per minute. At longer times, the flow rates for both the nanocomposite and unreinforced polymer decrease significantly and begin to diverge. For structure and property characterization, all aligned model nanocomposites were obtained during the first minute of extrusion.

Based on a series of experiments involving the production of composites using different processing parameters and subsequent structure characterization using TEM, processing parameters were chosen to fabricate the model nanocomposites. After solvent evaporation the micro-extruder was pre-heated to 155° C. and the polymer was melted and then mixed for three minutes at a screw speed of 100 RPM to disperse the nanotubes within the matrix. The screw speed was reduced to 20 RPM and the polymer melt extruded through a rectangular die (w=13 mm, t=0.35 mm).

As the polymer exited the die, the film was drawn in the molten state at various take-up rates and passed-over a chill roll to solidify. By examining the drawn films, it was determined that a draw ratio of 5, as defined by change in length of the drawn film relative to the calculated length of a film of the same mass with a cross-section equivalent to the dimensions of the extrusion die, resulted in good nanotube alignment of the film without excessive drawing. The as-drawn films ranged between 80 and 120 microns in thickness, depending on the draw ratio. Unreinforced polystyrene films were also processed using the same technique and draw ratios.

To understand the influence of drawing on the mechanical properties of the polymer and nanocomposite, specimens were also produced without drawing by compounding the material in the extruder followed by molding of the film in a hot press. Without extensional flow from the drawing process, the orientation of nanotubes in the composite is random.

To validate the weight percentage of nanotubes in the polymer matrix and also confirm that nanotubes are distributed throughout the matrix on the microscopic scale, thermogravimetric analysis (TGA) experiments were performed on the nanocomposite specimens as well as the unreinforced polymer. In TGA, the weight is measured as the sample is heated at a constant rate through its degradation temperature. Carbon nanotubes are thermally stable at much higher temperatures than the polystyrene matrix. After pyrolysis of the matrix, the residual mass can be utilized to calculate the weight percentage of nanotubes in the composite. TGA scans were performed under a flowing helium atmosphere and a heating rate of 20° C./min (TA Instruments Q500 TGA).

Figure 26:
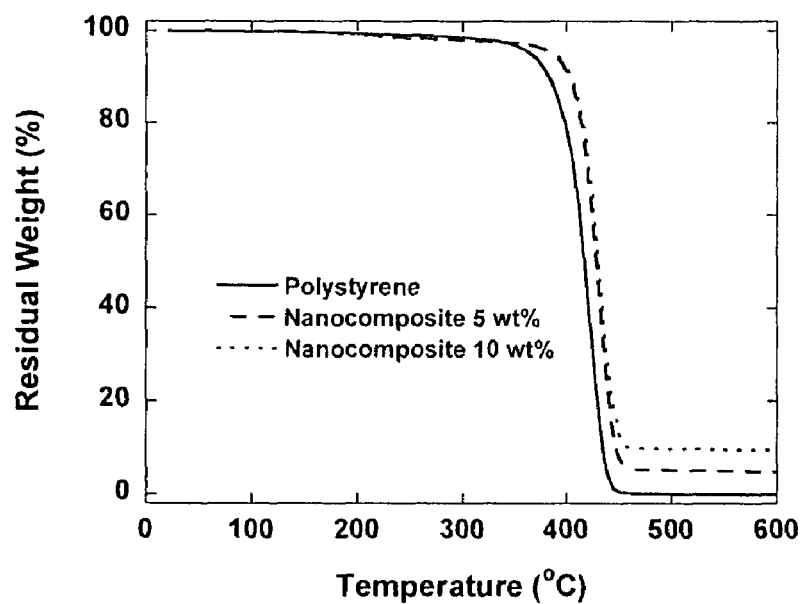
FIG. 26 shows TGA results for the different compositions.

FIG. 26 shows TGA results for the different compositions. After pyrolysis, the polystyrene is completely decomposed, and the residual weight of nanotubes can be taken as the weight percentage of nanotubes within the composite. As shown in FIG. 2.5, the 5 and 10 wt. % specimens show residual weight corresponding to their compositions. TGA scans on all of the nanocomposite specimens were less than +0.1% of the original composition, indicating both tight control over the nanotube loading content and uniform dispersion of nanotubes throughout the polymer matrix.

Figure 27:
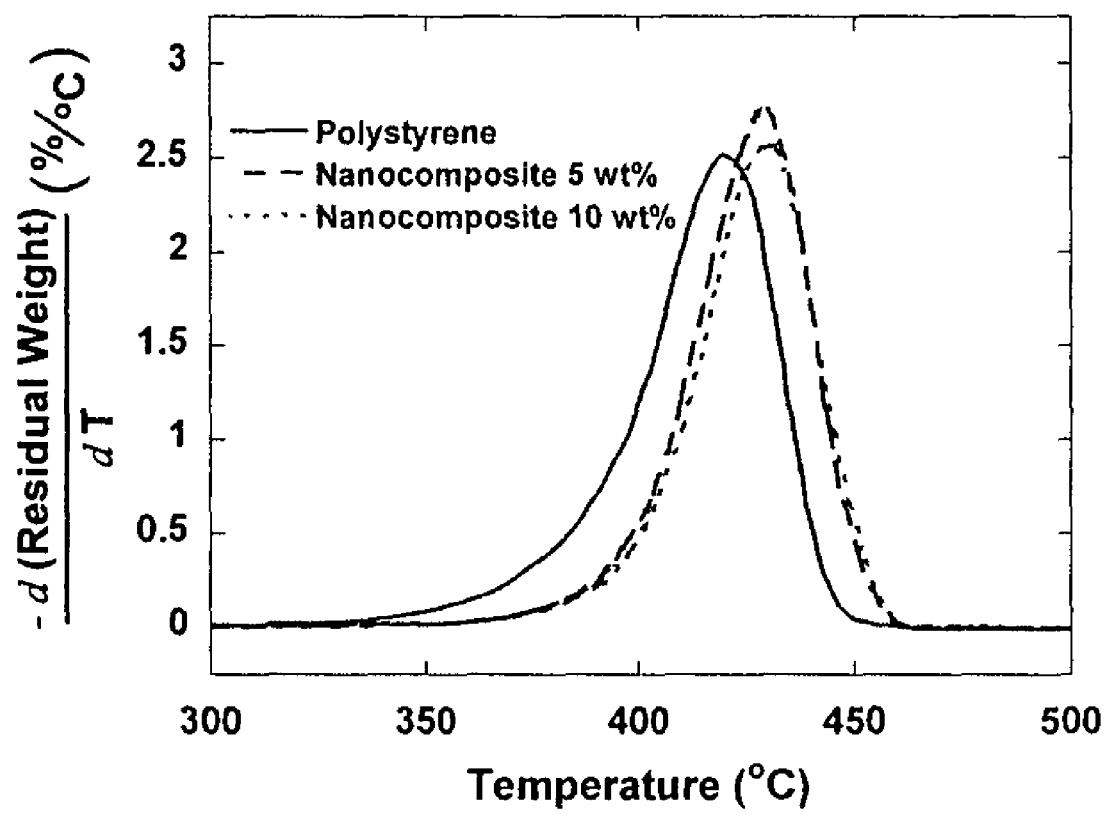
FIG. 27 shows the first derivative of the TGA scans.

In addition to validation of the nanocomposite composition, the TGA results in FIG. 26 show that the onset of degradation for the nanocomposites occurs at a slightly higher temperature than the bulk polystyrene. FIG. 27 shows the first derivative of the TGA scans. The broad single peak for degradation of polystyrene is consistent with degradation resulting from thermally activated scission of the polymer chain. The nanocomposite specimens show similar peaks as the polystyrene but with peak positions, indicating the highest rate of degradation, shifted from 418° C. to 430° C. The breadths of the peaks for the nanocomposite specimens are also slightly reduced. This slight improvement in the thermal stability for polystyrene, which is independent of nanotube loading, is likely a consequence of the inorganic carbon nanotubes distributed throughout the polystyrene impeding the diffusion of degradation products within the nanocomposite.

Figure 28A:
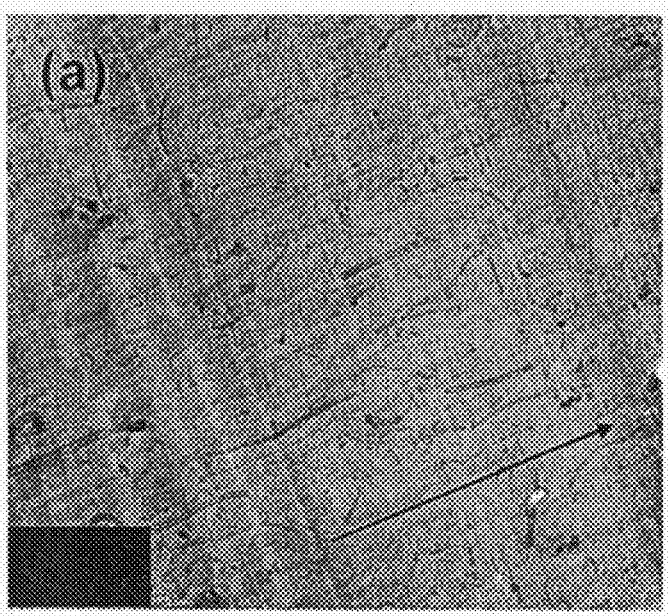
FIGS. 28A and 28B are TEM micrographs of nanocomposite films that were extruded using a microcompounder.
Figure 28B:
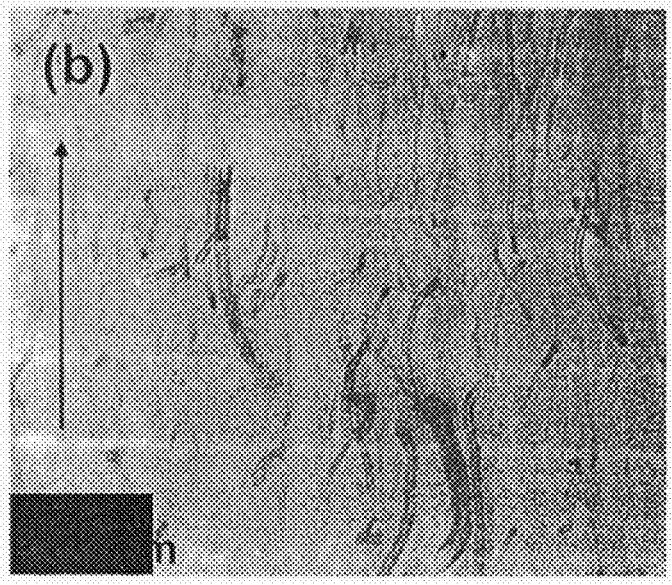

FIGS. 28A and 28B are TEM micrographs of nanocomposite films that were extruded using the microcompounder, and the arrows indicate the flow/drawing direction. To examine the influence of drawing on the nanotube orientation, samples were sectioned parallel to the flow/drawing direction. Once the nanocomposite films were sectioned, a microtome was used to cut slices of the films for observation in the TEM. Samples for TEM were relatively thick (200 nm) so as to minimize distortion of the structure by cutting the film with a diamond knife, and the cutting direction of the microtome knife was perpendicular to the flow/drawing direction. The horizontal gray lines in the TEM micrographs are artifacts from the cutting process and indicate that the film was cut normal to the direction of orientation. The TEM microgaphs show good dispersion of nanotubes and wet-out by the polymer matrix. In addition, drawing of the film from the melt resulted in significant alignment of the nanotubes within the polymer matrix.

FIG. 28A shows large-scale dispersion and overall alignment of the carbon nanotubes and FIG. 28B shows nanoscale tube alignment, particularly of the smaller diameter nanotubes not visible at the lower magnifications. By examining the drawn films, it was determined that a draw ratio of 5, as defined by change in length of the drawn film relative to the calculated length of a film of the same mass with a cross-section equivalent to the dimensions of the extrusion die, resulted in good nanotube alignment of the film without excessive drawing.

Figure 29:
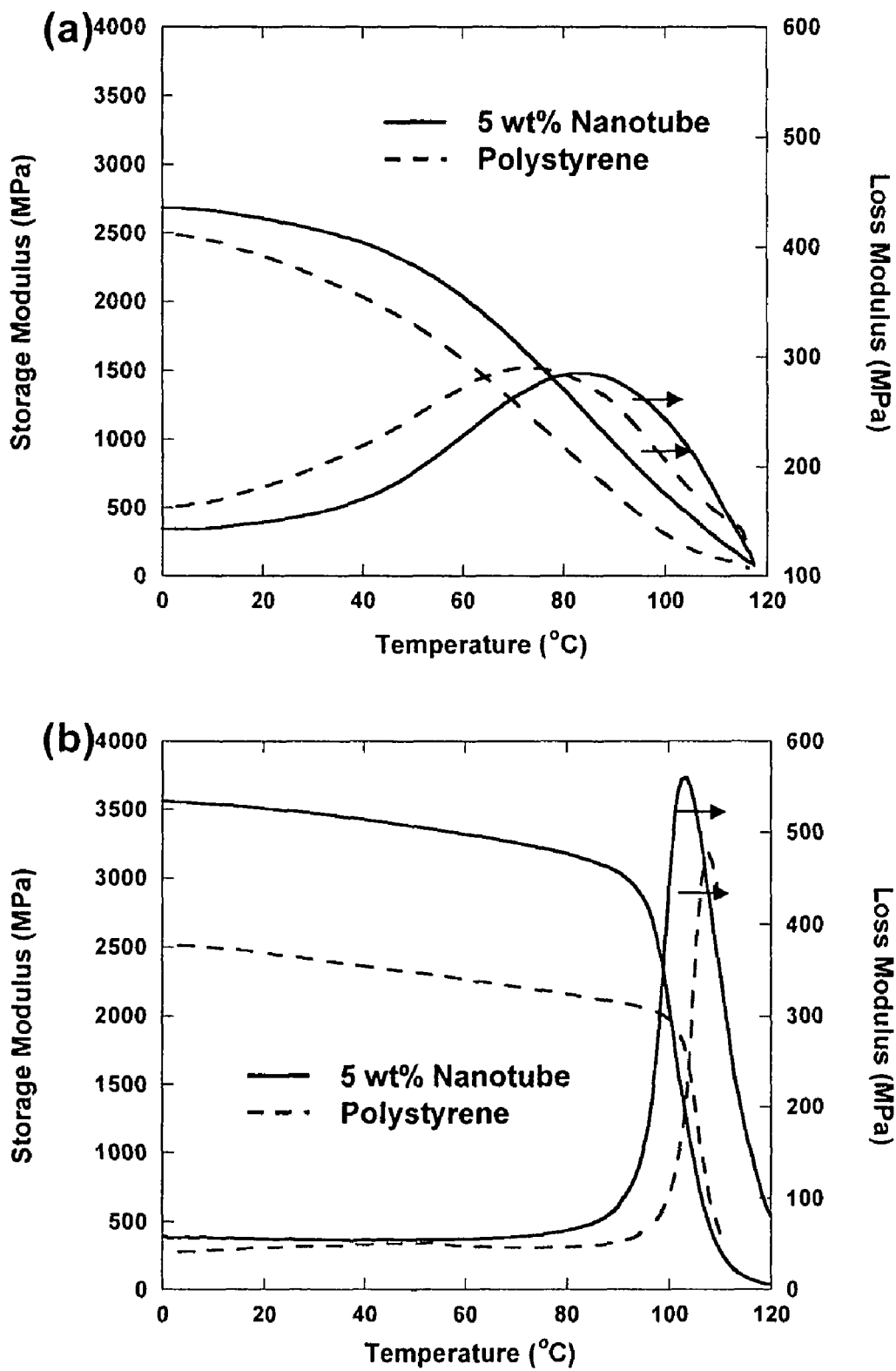
FIGS. 29A and 29B show results of a constant frequency temperature scan on the elastic and damping behavior of the films made in a hot press and drawn from a melt, respectively.

The films were then characterized using a Dynamic Mechanical Analyzer (DMA 2980—TA Instruments) in constant frequency and controlled force modes. FIGS. 29A and 29B show results of the constant frequency temperature scan (I Hz, 5° C./min) on the elastic and damping behavior of the films made in the hot press and drawn from the melt, respectively. For the films manufactured using a hot press, the orientation of the nanotubes is random. The addition of nanotubes results in a moderate increase in the elastic, storage modulus over the unreinforced polymer.

FIG. 29B shows the influence of nanotube orientation. As compared to the bulk polymer, the storage modulus at 25° C. of the aligned composites increased 49% as opposed to a 10% increase for the randomly oriented composites, resulting in a five fold relative increase for the aligned system over the random system. As expected, drawing of the polymer films resulted in a narrowing of the loss modulus peak and a peak shift to higher temperatures since the drawn films will result in higher molecular packing and lower free volume.

Figure 30:
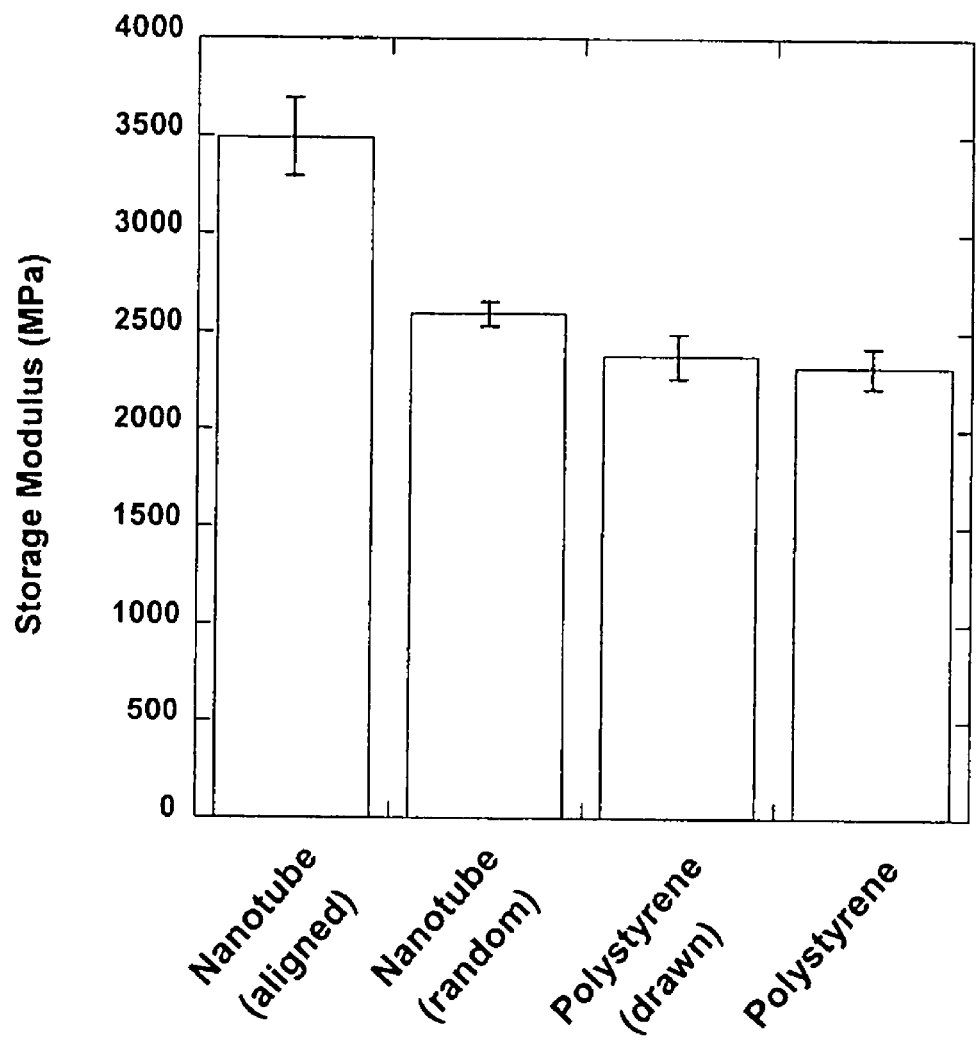
FIG. 30 shows the average storage modulus results at 25° C. for various films.

FIG. 30 shows the average storage modulus results at 25° C. for the various films. Polystyrene, an amorphous polymer, was chosen for the matrix material because the influence of drawing on elastic modulus would be negligible, enabling the direct examination of nanotube orientation on the elastic properties. Drawing of the polystyrene film resulted in a slight average increase in elastic modulus, but the modulus results for the drawn and hot-pressed specimens are within experimental scatter. Thus, the increase in elastic modulus between the random and aligned nanocomposite is a consequence of the nanotube orientation, not polymer chain orientation.

Figure 31:
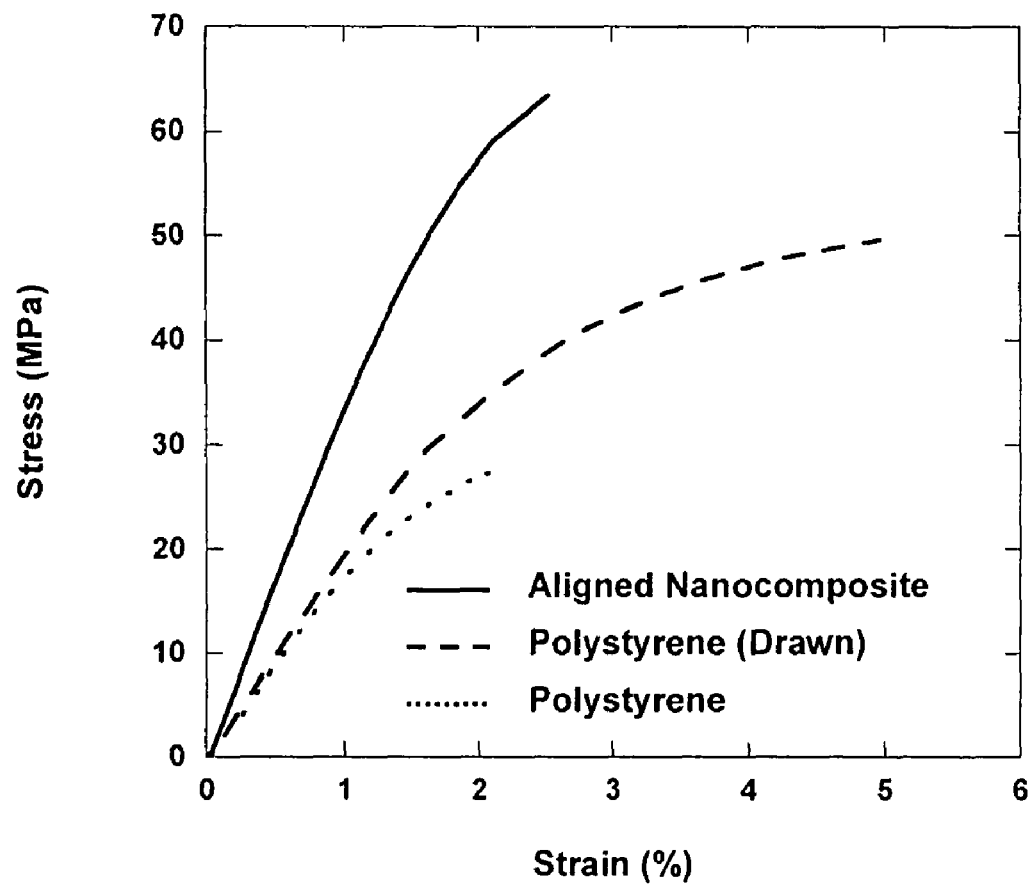
FIG. 31 shows that, in addition to the increase in elastic modulus, orientation of nanotubes improves yield strength and ultimate strength as compared to unreinforced polystyrene films.

To examine the influence of nanotubes on deformation and fracture behavior of the polymer films, the DMA was operated under controlled force mode to obtain static stress-strain curves (2 N/min, 25° C.). FIG. 31 shows that, in addition to the increase in elastic modulus, orientation of the nanotubes results in improvements in the yield strength and ultimate strength as compared to the unreinforced polystyrene films.

Increases in elastic modulus, yield strength, and ultimate strength indicate that nanotubes are acting as reinforcement in the polymer matrix by transferring load from the polymer to the nanotubes. Although the improvements in elastic modulus is lower than if it were assumed that the nanotube acts as a solid fiber with an elastic modulus of 1 TPa, the anisotropy of the aligned film as opposed to the random film is apparent and indicates that the nanotubes are acting as a fiber-like reinforcement in transferring axial load from the matrix via shear in the aligned composite system.

Figure 32A:
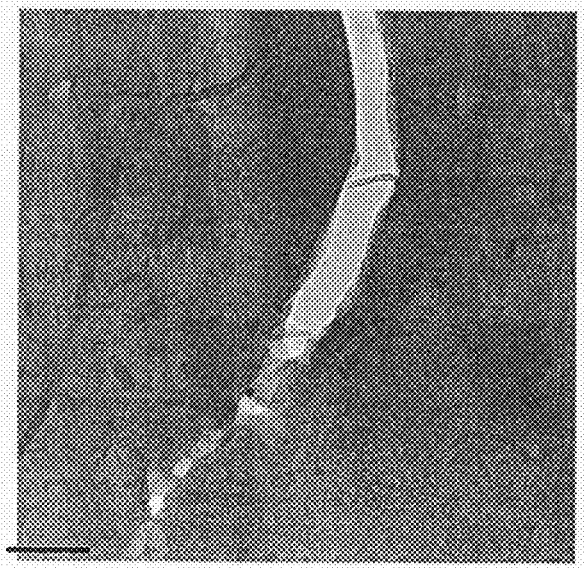
FIG. 32A is a TEM micrograph of a nanocomposite film specimen showing a crack interacting with nanotube reinforcement.
Figure 32B:
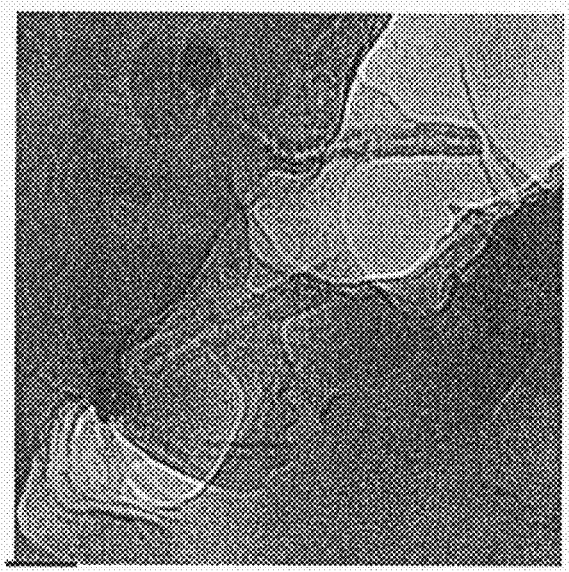
FIG. 32B illustrates broken nanotubes at a crack tip.

In FIG. 32A, a TEM micrograph of a nanocomposite film specimen shows a crack interacting with the nanotube reinforcement. It can be seen that a nanotube is bridging the crack, and a closer examination of the crack tip (FIG. 32B) reveals broken nanotubes. The presence of fractured tubes along with the matrix still adhered to the fractured tube indicates good wetting and adhesion of the nanotubes with the matrix.

A rectangular die was used in the embodiments discussed above in order to enhance alignment of the nanotubes within the polymer matrices. However, other dies shapes, such as circular, may also be used.

Thermoset/thermoplastic polymers are described in Stevens, Malcolm P, *Polymer chemistry: an introduction*, 3rd ed., New York Oxford University Press, 1999, the entire contents of which are hereby incorporated by reference.

Next, the ability of exemplary nanotube-epoxy composites to detect structural defects is described below with respect to FIGS. 33-39. According to aspects of the invention, glass fiber-epoxy composites, i.e. composite structures, are formed. The composite structures use multiwalled nanotubes dispersed in an epoxy phase as distributed sensors, in order to evaluate the onset and evolution of damage in composite structures, such as fiber composites. Exemplary carbon nanotubes form a conductive percolating network throughout the polymer matrix. The conductive percolating network is sensitive to initial stages of matrix-dominated failure. In examples described below, different failure modes of the composite structures are promoted to demonstrate the identification of the nature and progression of damage in the polymer matrix.

In general, long-term durability and performance of complex fiber composites are governed by properties of the polymer matrix and the fiber/matrix interface. In particular, the fatigue life and damage tolerance are typically strongly affected by matrix cracks occurring between fibers (i.e. microcracks) or between layers (i.e. ply delamination). Although an in-plane fracture behavior of composites is dominated principally by breakage of load-carrying fibers, initiation of damage in the polymer matrix may lead to premature fracture and reduced durability. The matrix dominated damage mechanisms often occur at low strain or because of out-of-plane loading. As a consequence, a considerable interest has emerged in the development of self-healing methodologies to minimize long-term effects of matrix cracking.

It is generally known that electrical techniques may be used as a noninvasive way to monitor damage in carbon-fiber-reinforced composites under static and dynamic loading conditions. Because carbon fibers are conductive, fracture of fibers typically results in changes in electrical resistance. This approach, however, does not give much insight into matrix-dominated mechanisms of fracture that affect durability and may not be applicable to composites where fibers are non-conducting (such as glass or aramid fibers). Others techniques have attempted to locally modify electrical properties of glass fiber yarn bundles through coating with carbon powder and utilizing them for damage sensing.

Figure 33A:
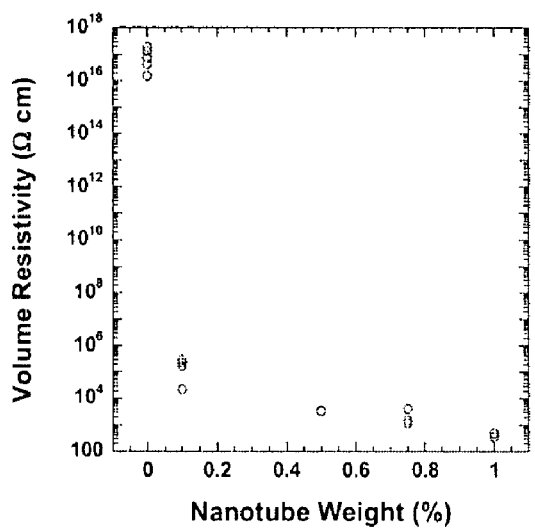
FIG. 33A is a graph illustrating electrical percolation behavior in a nanotube-epoxy composite, according to an embodiment of the invention.
Figure 33B:
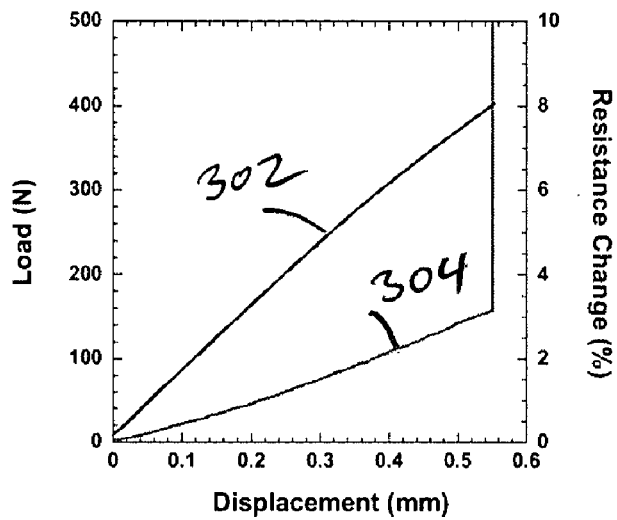
FIG. 33B is a graph illustrating changes in resistance in an exemplary composite structure loaded in tension, according to an embodiment of the invention.

FIG. 33A is a graph illustrating electrical percolation behavior in a nanotube-epoxy composite. FIG. 33B is a graph illustrating changes in resistance in an exemplary 0.5 wt % nanotube-epoxy composite loaded in tension. If the high aspect ratio (length/diameter) of carbon nanotubes is preserved while processing a polymer nanocomposite, the nanotubes can form a conductive percolating network throughout the polymer matrix at relatively low concentrations. The polymer nanocomposites are processed as described above using a high shear stress field. This technique maintains the relatively large aspect ratio of the nanotubes and results in percolation thresholds, where there is a sharp decrease in the composite volume resistivity, at or below 0.1 wt % carbon nanotubes, as shown in FIG. 33A. FIG. 33B shows load curve 302 and resistance change curve 304 as a function of displacement. As shown in FIG. 33B, a tensile test performed on a nanotube/epoxy specimen also shows a highly liner relationship between the specimen deformation and electrical resistance.

Referring now to FIGS. 34A and 34B, flowcharts illustrating exemplary methods for detecting defects in a polymer matrix are described. In particular, FIG. 34A illustrates detection of defects in a nanocomposite; and FIG. 34B illustrates detection of defects when the nanocomposite is combined into a composite structure.

Referring to FIG. 34A, at step 10, a plurality of nanotubes are formed. For example, multiwalled carbon nanotubes may be grown by chemical vapor deposition. At step 12, a nanocomposite is formed by shear mixing nanotubes with a polymer, as described above. By shear mixing, the plurality of nanotubes are mechanically aligned in a principle direction.

At step 14, electrodes are coupled to the nanocomposite. The electrodes may be coupled in any suitable location. At step 16, a voltage is applied to the nanocomposite via the electrodes. With the application of a voltage, the plurality of nanotubes acts as a conducting percolating network of sensors throughout the polymer matrix. At step 18, a resistance of the nanocomposite is measured using the applied voltage. For example, a current may be directly measured and a resistance measured based on the ratio of the applied voltage to the measured current.

Referring to FIG. 34B, at step 20, a composite structure is formed by combining an exemplary nanocomposite, for example, by repeating steps 10 and 12 (FIG. 34A), with one or more layers of fibers. For example, the composite structure may be formed using a vacuum-assisted resin transfer molding process. Examples of composite fiber structures are described below.

At step 22, electrodes are formed on the composite structure. The electrodes may be formed on any suitable location of the composite structure. At step 24, a voltage is applied to the composite structure via the electrodes. At step 26, a resistance of the nanocomposite, which is combined with the layers of fibers, is measured using the applied voltage.

Figure 35:
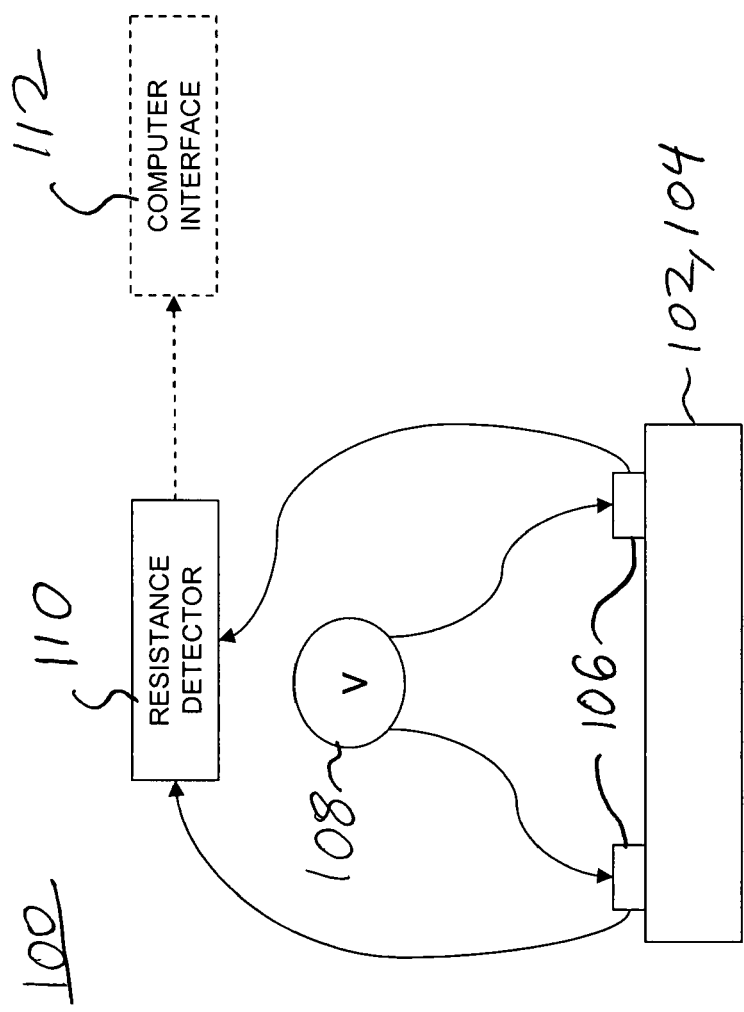
FIG. 35 is a block diagram of an exemplary structural defect detector, according to an embodiment of the invention.

FIG. 35 illustrates an exemplary structural defect detector 100, according to an embodiment of the present invention. Detector 100 includes nanocomposite 102. In FIG. 35, both the nanocomposite 102 and a composite structure 104 (including nanocomposite 102 distributed within composite structure 104) are illustrated. A voltage source 108 is coupled to nanocomposite 102 via electrodes 106. A resistance detector 110 measures a resistance of nanocomposite 102. Detector 110 may be a detector that includes a resistance calculator that calculates resistance based upon the voltage applied by voltage source 108 and a measured current. A computer interface 112 may also be included, for example, to record values for the measured resistance.

According to the present invention, exemplary conducting carbon nanotube networks formed in an epoxy polymer matrix may be used as highly sensitive sensors for detecting the onset, nature, and evolution of damage in advanced polymer-based composites. The internal damage accumulation of the polymer matrix can be monitored in situ by using direct-current measurements. It has been determined that after the onset of damage and subsequent reloading of the damaged structure there is a shift in the resistance sensing curve, indicating irreversible damage. An exemplary structural defect detector 100 (FIG. 35) may be used, for example, for evaluation of autonomic self-healing approaches for polymers and development of enhanced life prediction methodologies.

Owing to the difference in reinforcement scale between conventional micrometer-sized fiber reinforcement and carbon nanotubes with nanometer-sized diameters, it is possible to have carbon nanotube reinforcement in the matrix-rich areas between fibers in an individual bundle as well as between adjacent plies. The properties of fiber composites may be altered through nanoscale hybridization, where nanoscale reinforcement can be included to improve the out-of-plane composite properties or to stiffen the fiber/matrix interface. For mechanical reinforcement, the effectiveness of multiwalled carbon nanotubes may be limited by the intratube van der Waals interaction that reduces the effective stiffness of the nanotube in the polymer matrix.

By first dispersing the nanotubes in the polymer matrix and then infiltrating the dispersed mixture through layers and bundles of conventional fibers, the nanotubes are able to penetrate throughout and form a conductive percolating network in the polymer matrix. This network formation in the polymer matrix offers significant potential to develop hierarchal sensing approaches for damage detection and health monitoring. Electrical percolation with multiwalled carbon nanotubes at extremely low volume fractions enables the creation of in situ sensors that are minimally invasive and not likely to substantially alter the in-plane mechanical properties of the fiber composite.

The present invention is illustrated by reference to examples. The examples are included to more clearly demonstrate the overall nature of the invention. These examples are exemplary, not restrictive of the invention.

In the examples shown below, multiwalled carbon nanotubes grown using chemical vapor deposition techniques with purity higher than 95% (Iljin Nanotech) were used to create the percolating network of sensors. Scanning electronmicroscopy (SEM) images of as-grown carbon nanotubes show they are highly entangled and have diameters on the order of 20-30 nm and lengths of several micrometers. The epoxy polymer matrix used is a bisphenol-F epoxy resin cured with an aromatic amine curing agent (EPIKOTE Resin 862/EPIKURE W Curing Agent; Hexion Specialty Chemicals).

To fabricate the nanotube-epoxy-fiber composites, the carbon nanotubes were first dispersed in the epoxy resin using a calendaring approach. A laboratory-scale three-roll mill (EX-AKT-80E; EXAKT Technologies) was utilized to impart high shear mixing to the nanotube-epoxy mixture to untangle and disperse the nanotubes. Nanotubes were weighed out for a final concentration of 0.5 wt %, added to the epoxy resin by hand mixing and then processed using a three-roll mill. The mixture was processed by passing through the mill at progressively decreasing gap settings down to 5 µm. The evolution of the nanoscale composite structure during the process was evaluated using transmission electron microscopy (JEOL 2000FX; 200 kV) to ensure a high degree of dispersion.

Vacuum-assisted resin transfer molding was used to fabricate the fiber-epoxy composites with embedded carbon nanotubes. Unidirectional nonwoven glass fiber mats were laid up and stacked in preferred orientations. For cross-ply composites $[0/90]_s$, the laminate consisted of four layers with two layers on the top and bottom with a zero-degree orientation to the load direction and two layers in the middle orthogonal to the top and bottom plies. Unidirectional composites consisted of five layers of fabric oriented in the same direction $[0]_5$ where the center ply was cut to initiate delamination during tensile loading. Composites tested in flexure were formed from eight layers of unidirectional fabric $[0]_8$. The lay up was then compacted under vacuum using a vacuum bag. After dispersing nanotubes in the epoxy resin, it was heated to 50° C. to reduce the viscosity and then mixed with the curing agent at a ratio of 26.4:100 curing agent to epoxy. The mixture was mechanically stirred and degassed in a vacuum oven for 15 min at 50° C. Composites were fabricated by drawing the resin mixture through the glass fibers under vacuum and then curing for 6 hours at 130° C.

Test specimens were machined from the cured composite laminates to desired dimensions using a slot grinder. End tabs were bonded to tensile specimens to minimize the stress concentration caused by the grips of the mechanical testing machine. The material used for the end tabs was a non-conducting glass-epoxy composite to electrically insulate the conductive composite laminate from the metallic specimen grips. Nanotube-epoxy tensile bars were electrically insulated by curing a film of neat epoxy in the grip area and three-point bend specimens were electrically insulated from the load supports using electrical tape. Mechanical testing in tension and flexure was performed using a screw-driven load frame (Instron 5587), and specimen deformation is expressed in terms of machine crosshead displacement.

Electrodes were applied to the composites using conductive silver paint and changes in resistance were measured using a highly sensitive voltage-current meter (Keithley 6430). For the unidirectional and nanocomposite tensile specimens the electrodes were applied to the specimen surfaces just below the end tabs and on opposing sides. Electrodes for the cross-ply specimens were applied directly to the specimen ends, and the electrodes for flexural testing were applied to the specimen tensile and compressive sides. A computer interface was used to record the transient changes in resistance during mechanical testing. Because the mechanical tests were performed at fixed crosshead-displacement rates, the transient resistance data could be directly related to test displacement. A constant source voltage was applied to the specimens during testing and the current was measured to calculate the resistance changes. The source meter was also used to measure the DC volume resistivity of the nanotube-epoxy composites.

Examples of Detecting Damage Composites under Tensile Loading

Figures 36A, 36B, 36C:
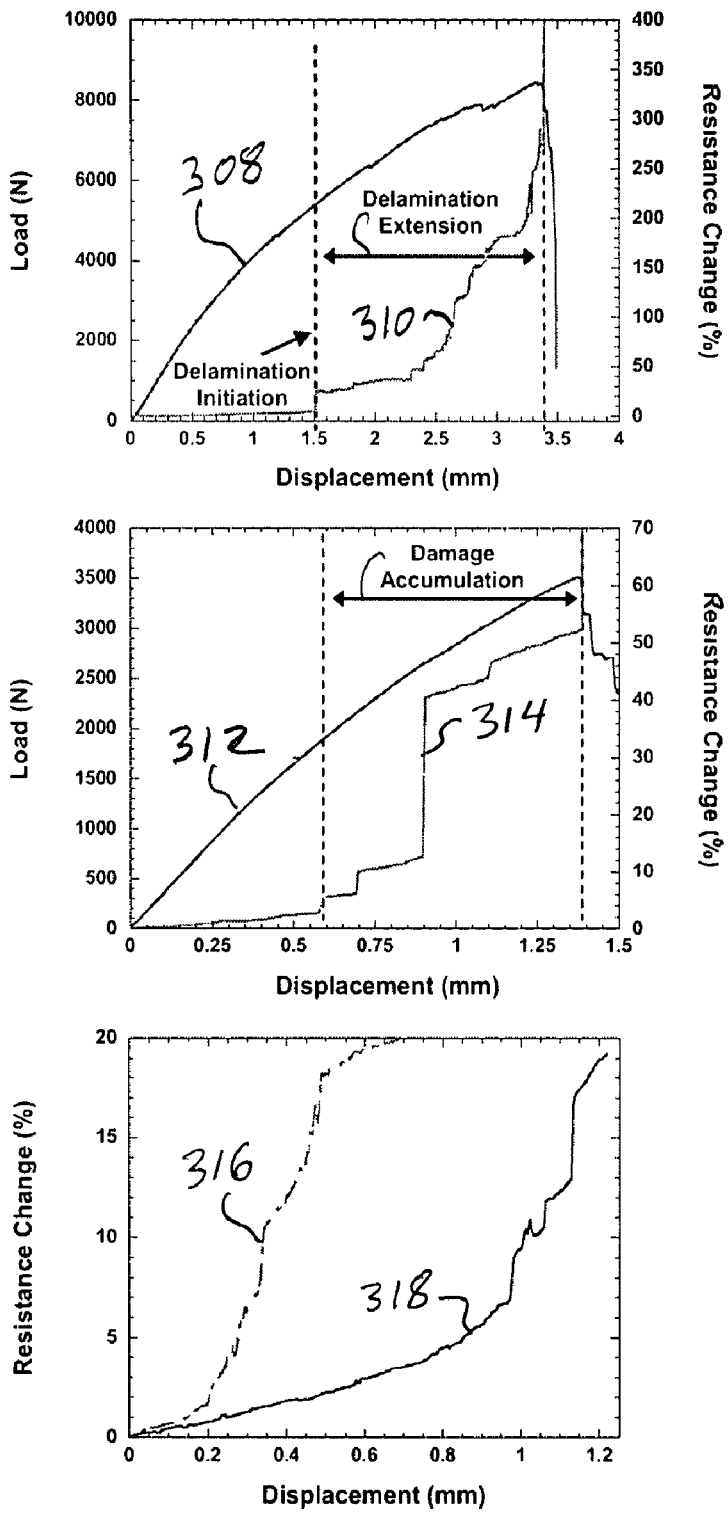
FIGS. 36A-36C are graphs illustrating load-displacement and changes in resistance for exemplary composite structures under tensile loading.

FIGS. 36A-36C are graphs illustrating load-displacement and changes in resistance for composite structures under tensile loading. In particular, FIG. 36A is a graph of load-displacement curve 308 and resistance curve 310 for the 0° composite with center ply cut to initiate delamination; FIG. 36B is a graph of load-displacement curve 312 and resistance curve 314 for the 0/90 composite; and FIG. 36C is a graph of resistance curve 316 (dashed line) for initial loading (undamaged) and resistance curve 318 (solid line) for reloading (damaged) laminates.

In order to evaluate and assess the formation of nanotube networks for in situ sensing, exemplary nanotube-glass fiber-epoxy composites were processed and designed specific mechanical tests to promote distinct failure modes. Key experiments in tension are used to evaluate interlaminar delamination in unidirectional composites and transverse microcracking in cross-ply laminates. When subject to bending, unidirectional specimens were tested with different spans to promote different failure modes. The specimen strain was not recorded using an external extensometer or bonded strain gages in order to avoid any influence on the resistance measurements. The deformation data is instead presented in terms of the crosshead displacement of the testing machine and is proportional to strain.

A five-ply unidirectional composite was fabricated where the center ply of the laminate was cut in the middle of the specimen to promote ply delamination during tensile loading. The discontinuity at the center ply of the laminate results in the accumulation of shear stresses at the ends of the ply and these shear stresses initiate delamination of the center and adjacent plies.

FIG. 36A shows the results of the tensile test. The specimen resistance (resistance curve 310) increases linearly with initial deformation and is consistent with our earlier observation of linear increase in resistance with deformation in nanotube-epoxy specimens. A sharp increase in resistance occurs when the ply delamination is initiated. As the delamination grows with increasing load (load curve 308) there is a large increase in resistance marked primarily by a progressive increase in the slope of the resistance curve 310 with extension of the ply delamination.

The influence of transverse microcrack development in plies oriented normal to the direction of loading was investigated using a [0/90]s cross-ply specimen with plies oriented along the loading axis (0°) on the outside of the laminate and plies oriented at 90° in the center. It is known in cross ply laminates loaded in tension that failure initiates in the 90° plies by the formation of microcracks that are oriented normal to the direction of applied load. As the laminate is further strained, more cracks are formed until the ply becomes saturated with a regularly spaced array of cracks and the crack density is related to laminate configuration.

As observed in the unidirectional specimen there is a linear increase in resistance (resistance curve 314) with initial loading in the cross-ply specimens (FIG. 36B). Upon the initiation of microcracking in the 90° plies, there is a sharp change in the resistance. In the progression from the first initiation of cracking to ultimate failure of the composite laminate the resistance changes are marked by step increases corresponding to the accumulation of microcracks and linear increases with deformation between the step increases. By comparing resistance curves 310 and 314 in FIGS. 36A and 36B it is possible to identify the nature and progression of damage using nanotubes.

For both the 0 and 0/90 specimens there is a slight degradation in the stiffness with increasing damage accumulation, but the change in slope is small relative to the overall specimen stiffness. Additional experiments were assessed to evaluate the resistance-deformation behavior of pre- and post-damage initiation. FIG. 36C shows the changes in resistance with deformation during loading of the composite laminate. The specimen was first loaded until the initial step increases related to the initiation of microcracking was observed (resistance curve 316). Upon unloading, the resistance decreased to nearly the original value as the transverse cracks were closed by the stiff outer plies.

Upon reloading, the specimen showed sharp increases in resistance (resistance curve 318) at much lower levels of deformation corresponding to reopening of the microcracks, indicative of permanent damage to the composite. This approach may be a powerful technique to evaluate the effectiveness of self-healing methodologies. After initial cracking the residual stiffness of the composite is still quite high, and evaluation of self-healing strategies using residual stiffness measurements do not provide direct insight toward the effectiveness and extent of matrix healing because the stiffness is fiber dominated. Monitoring the shift in the resistance curves on loading and unloading may directly correspond to an accumulated damage. The specimen is first loaded in tension to initiate damage and then unloaded to obtain the damaged resistance curve. After the material is allowed sufficient time to heal, the resulting resistance curve upon reloading may shift toward the undamaged resistance curve and, thus, may provide a direct assessment of healing effectiveness.

Example of Detection of Damage Under Flexural Loading

Figure 37:
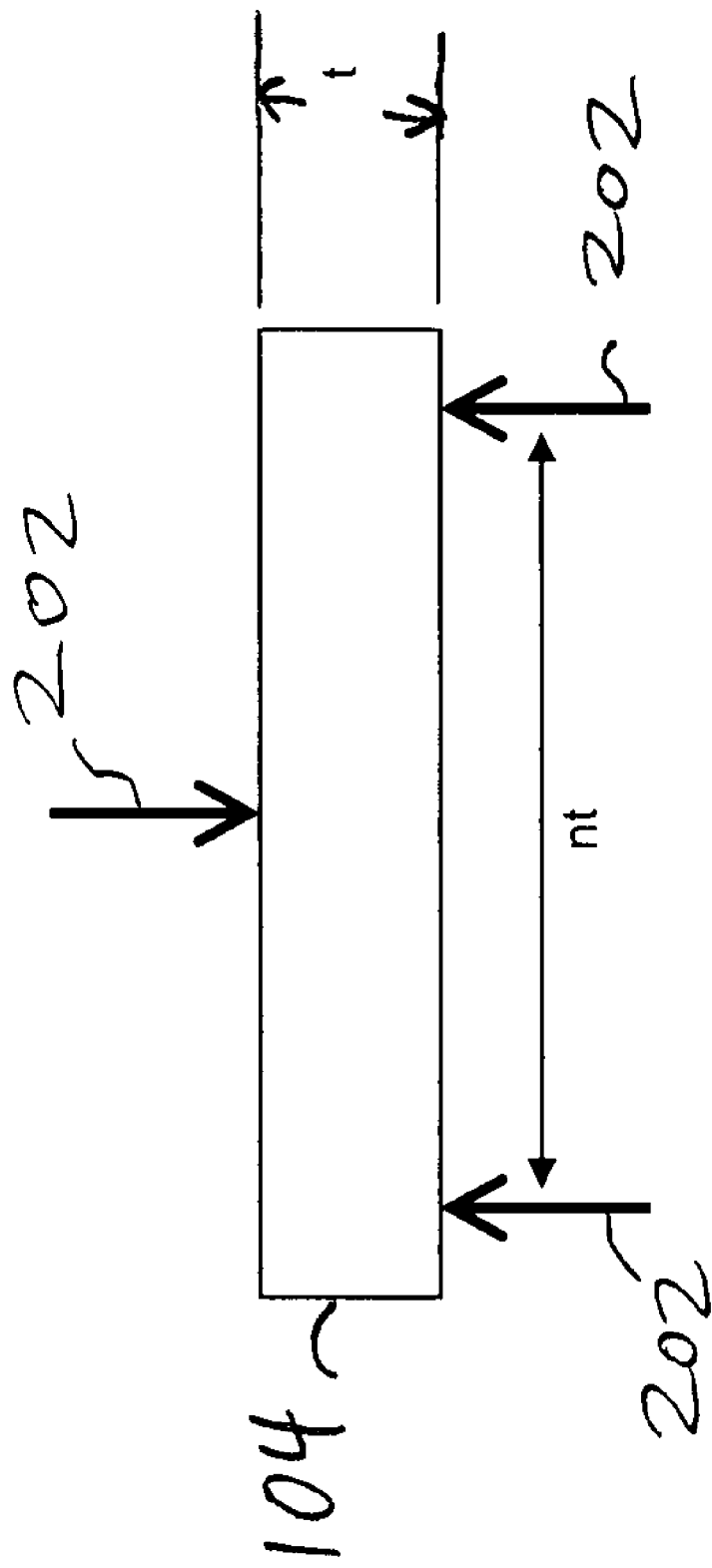
FIG. 37 is an example of flexural loading applied to an exemplary unidirectional nanotube-epoxy composite, according to an embodiment of the invention.
Figure 38B:
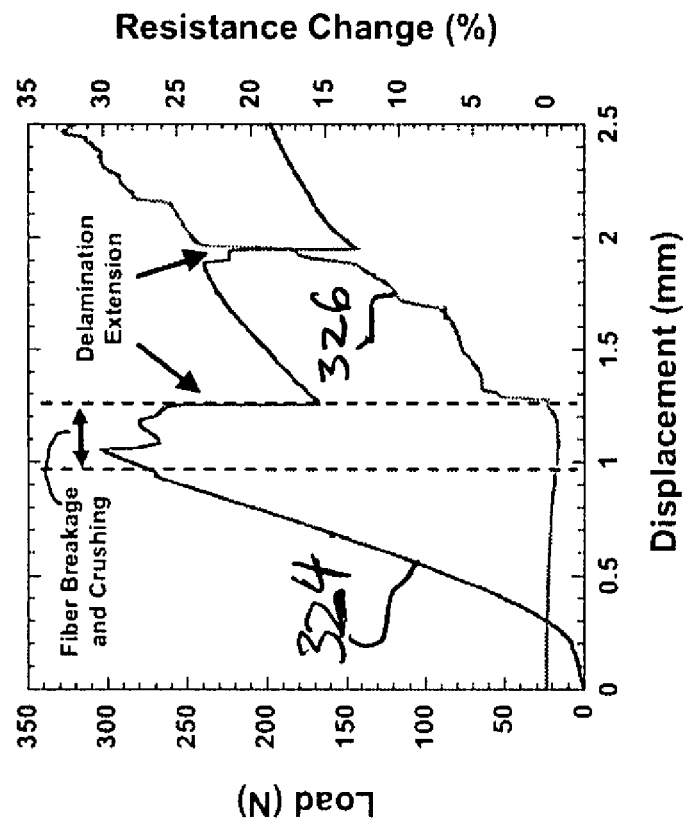
FIGS. 38A and 38B are graphs illustrating load displacement and changes in resistance of exemplary unidirectional nanotube-epoxy composites under flexural loading, according to an embodiment of the invention.
Figure 38A:
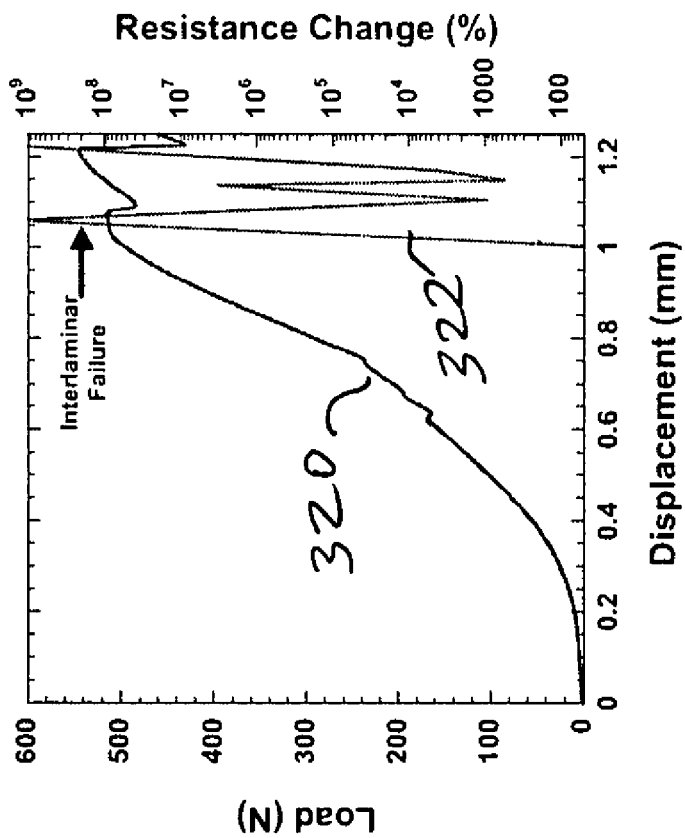
Figure 39B:
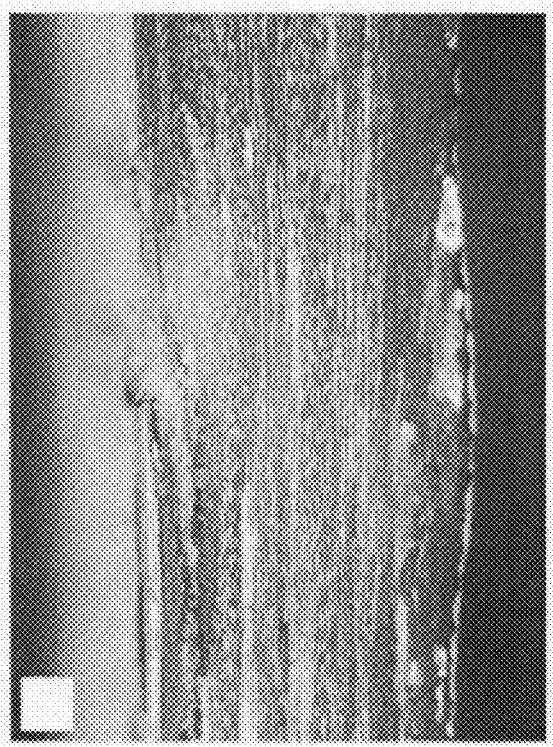
FIGS. 39A and 39B are images illustrating interlaminar fracture and fiber/matrix damage with flexural loading, according to an embodiment of the invention.
Figure 39A:

FIG. 37 is an example illustrating flexural loading 202 applied to an exemplary unidirectional nanotube-epoxy composite 104. In FIG. 37, t refers to a thickness and nt to t refers to a span-to-thickness ratio, where n is a positive integer. FIGS. 38A and 38B are graphs illustrating load displacement and changes in resistance of composites 104 under flexural loading for respective span-to-thickness ratios of 4 (n=4) and 8 (n=8). FIGS. 39A and 39B are optical microscopic images illustrating interlaminar fracture and fiber/matrix damage with flexural loading for respective span-to-thickness ratios of 4 and 8.

For laminated composites the reinforcement is primarily oriented in-plane. When subject to bending the layers of the composite transfer the load through shear stresses at the ply interfaces. Composites are particularly susceptible to failure at the ply interfaces because the polymer matrix must transfer the entire shear load from layer to layer. When subject to out of-plane loads, such as low velocity impact, the local shear stress can result in delamination of the plies.

In order to assess the capability of nanotubes to sense through-thickness interlaminar fracture, unidirectional specimens were tested in three point bending at varying spans (FIG. 37). As the span is increased, the moment is higher and may produce stresses high enough to promote fiber fracture as in the initial deformation mechanism. Specimens were tested at span-to-thickness ratios of four and eight to promote the different types of failure. FIGS. 38A and 38B illustrates the load versus midspan displacement results (load curves 320 and 324) for the short (n=4) and long (n=8) spans, respectively. With initial loading, both show a slight decrease in the resistance (resistance curves 322, 326) as the beam is deformed in both tension and compression. At the point of failure for the beam with the short span, the resistance increases by several orders of magnitude indicating that the specimen has delaminated completely.

Viewing the side of the as-tested short-span specimen, shown in FIG. 39A, clearly reveals the formation of an interlaminar crack. Subsequent reloading and large resistance spikes are likely a consequence of interlaminar friction and the establishment of new electrical contacts. For the long-span specimen there are slight decreases in load that correspond to a flattening of the resistance curve. These load drops are likely due to fiber breakage and crushing under the load nose. The side of the long-span specimen, FIG. 39B, shows fiber and matrix damage directly below the midspan load point. Subsequent sharp decreases in load are accompanied by step increases in resistance and likely correspond to matrix cracking and the extension of local delamination. Unlike the specimen that fails in interlaminar shear, where the resistance changes several orders of magnitude corresponding to complete ply separation, the more incremental changes in resistance correspond to damage accumulation.

In situ monitoring using carbon nanotubes offers potential as both a laboratory tool for evaluating damage progression during testing as well as for in-service health monitoring. The exploration of strategies for sensor configuration and tailoring nanotube concentration may help shed light on the progression and characteristic of damage states. According to the present invention, exemplary conductive percolating nanotube networks in fiber composites may accurately detect the onset, nature, and progression of damage. The sensitivity of the technique for damage sensing may have broad applications including the assessment of self-healing strategies.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

STATEMENT OF INDUSTRIAL APPLICABILITY

This has industrial applicability for uses in structural, electrical (e.g. EMI shielding, electronics) and thermal (e.g. heat dissipation) applications for multi-functional materials and devices based upon carbon nanotubes, among other uses.

What is claimed is:

1. A method of detecting a structural defect in a composite structure, the method comprising:
    forming a nanocomposite comprising a plurality of nanotubes within a polymer matrix, the plurality of nanotubes formed as a conducting network of sensors;
    applying a voltage to the nanocomposite; and
    measuring a resistance of the nanocomposite using the applied voltage to detect the structural defect, wherein detecting the structural defect comprises detecting microcracks and/or ply delamination by the polymer matrix.

2. The method according to claim 1, comprising forming the nanocomposite by shear mixing the plurality of nanotubes with a polymer in an extruder to disperse the nanotubes within the polymer matrix, extruding the mixture from the extruder, and drawing the mixture prior to solidification of the mixture.

3. The method according to claim 1, wherein the plurality of nanotubes are formed as a conducting percolating network of sensors.

4. The method according to claim 1, further comprising determining an onset or a change in the structural defect based on the measured resistance.

5. The method according to claim 1, further comprising measuring a DC volume resistivity of the nanocomposite.

6. The method according to claim 1, further comprising:
forming the composite structure by combining one or more layers of fibers and the nanocomposite; and
applying electrodes to the composite structure to apply the voltage to the nanocomposite.

7. The method according to claim 6, wherein the fibers in the one or more layers of fibers are arranged in a unidirectional orientation, in a cross ply orientation or a combination thereof.

8. The method according to claim 6, wherein the step of forming the composite structure includes applying a vacuum assisted resin transfer molding of the nanocomposite to the one or more layers of fibers.

9. The method according to claim 1, wherein the plurality of nanotubes are mechanically aligned in a principal direction.

10. The method according to claim 9, wherein the plurality of nanotubes are mechanically aligned in the principal direction to a standard deviation from the principal direction of less than ±15°.

11. A structural defect detector comprising:
a nanocomposite comprising a plurality of nanotubes within a polymer matrix;
electrodes coupled to the nanocomposite;
a voltage source for applying a voltage to the electrodes; and
a resistance detector for measuring a resistance of the nanocomposite that allows identification of a structural defect,
wherein the plurality of nanotubes form a conducting percolating network of sensors, and
the structural defect comprises microcracks and/or ply delamination by the polymer matrix.

12. The structural defect detector according to claim 11, wherein the polymer matrix comprises a polymer selected from the group consisting of thermoplastic polymers and thermoset materials.

13. The structural defect detector according to claim 11, wherein the nanotubes comprise carbon nanotubes.

14. The structural defect detector according to claim 11, wherein the resistance detector comprises a resistance calculator for calculating resistance based on the applied voltage.

15. The structural defect detector according to claim 11, wherein the nanocomposite is combined with one or more layers of fibers by a vacuum assisted resin transfer molding as a composite structure and the electrodes are formed on the composite structure.

16. The structural defect detector according to claim 15, wherein the fibers in the one or more layers of fibers are arranged in a unidirectional orientation, in a cross ply orientation or a combination thereof.

17. The structural defect detector according to claim 15, wherein the fibers include glass fibers or aramid fibers.

18. The structural defect detector of claim 11, wherein the nanocomposite comprises a nanocomposite formed by shear mixing the plurality of nanotubes with a polymer in an extruder to disperse the nanotubes within the polymer matrix, extruding the mixture from the extruder, and drawing the mixture prior to solidification of the mixture.

19. The structural defect detector of claim 11, wherein the plurality of nanotubes are mechanically aligned in a principal direction.

20. The structural defect detector of claim 19, wherein the plurality of nanotubes are mechanically aligned in the principal direction to a standard deviation from the principal direction of less than ±15°.

* * * * *